US012312066B2

(12) United States Patent
Brookes

(10) Patent No.: US 12,312,066 B2
(45) Date of Patent: May 27, 2025

(54) PROPULSOR ASSEMBLY OF AN ELECTRIC AIRCRAFT

(71) Applicant: BETA AIR LLC, South Burlington, VT (US)

(72) Inventor: Kyle Brookes, Richmond, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 18/129,424

(22) Filed: Mar. 31, 2023

(65) Prior Publication Data

US 2024/0326983 A1 Oct. 3, 2024

(51) Int. Cl.
| B64C 11/44 | (2006.01) |
| B64C 27/605 | (2006.01) |
| B64D 27/24 | (2006.01) |

(52) U.S. Cl.
CPC ............ B64C 11/44 (2013.01); B64C 27/605 (2013.01); B64D 27/24 (2013.01)

(58) Field of Classification Search
CPC ....... B64C 11/44; B64C 27/605; B64U 10/14; B64U 30/29; B64U 30/20; B64U 10/15
See application file for complete search history.

(56) References Cited

U.S. PATENT DOCUMENTS

| 2,495,523 A | 1/1950 | Hays |
| 2,549,887 A | 4/1951 | Buivid |
| 2,626,766 A | 1/1953 | McDonald |
| 2,669,311 A | 2/1954 | De et al. |
| 2,731,215 A | 1/1956 | Avery |
| 2,994,386 A * | 8/1961 | Enstrom ............... B64C 27/605 416/114 |
| 3,052,305 A | 9/1962 | Jones et al. |
| 3,109,496 A * | 11/1963 | Ellis, III ............... B64C 27/615 416/98 |
| 3,135,334 A | 6/1964 | Culver |
| 3,246,862 A | 4/1966 | Leo et al. |

(Continued)

FOREIGN PATENT DOCUMENTS

| DE | 202007014395 U1 * | 1/2008 | ............. B64C 27/10 |
| DE | 102009012903 A1 | 9/2010 | |

(Continued)

OTHER PUBLICATIONS

J.C.Casabuono, Forced Auto, (forum), Dec. 6, 2011.

(Continued)

*Primary Examiner* — Philip J Bonzell
(74) *Attorney, Agent, or Firm* — Brake Hughes Bellermann LLP

(57) ABSTRACT

A propulsor assembly of an electric aircraft is described. The propulsor assembly includes an electric motor, where the electric motor includes a stator and a rotor. The assembly further includes a propulsor mechanically connected to the rotor of the electric motor. The assembly also includes a cyclic control assembly including an electric actuator and a push rod, wherein the push rod is mechanically connected to the actuator and the propulsor, the push rod is configured to increase a blade angle of the propulsor when the push rod is displaced in a first direction, and the push rod is configured to decrease the blade angle of the propulsor when the push rod is displaced in a second direction.

20 Claims, 10 Drawing Sheets

(56) References Cited

U.S. PATENT DOCUMENTS

| | | |
|---|---|---|
| 3,288,226 A | 11/1966 | Lemont et al. |
| 3,370,809 A | 2/1968 | Leoni |
| 3,533,713 A | 10/1970 | Salmun |
| 3,762,667 A | 10/1973 | Pender |
| 4,092,084 A | 5/1978 | Barltrop |
| 4,109,885 A | 8/1978 | Pender |
| 4,115,031 A | 9/1978 | Drees et al. |
| 4,310,284 A | 1/1982 | Randolph |
| 4,443,154 A | 4/1984 | Randolph |
| 4,573,873 A * | 3/1986 | Yao ............... B64C 27/59 416/114 |
| 4,913,411 A | 4/1990 | Collins et al. |
| 5,028,210 A | 7/1991 | Peterson et al. |
| 5,032,057 A | 7/1991 | Speer |
| 5,145,321 A | 9/1992 | Flux et al. |
| 5,259,729 A | 11/1993 | Fujihira et al. |
| 5,301,900 A | 4/1994 | Groen et al. |
| 5,304,036 A | 4/1994 | Groen et al. |
| 5,433,669 A | 7/1995 | Chang et al. |
| 5,511,947 A | 4/1996 | Schmuck |
| 5,826,822 A * | 10/1998 | Rehm ............... B64C 27/59 416/114 |
| 6,082,968 A | 7/2000 | Nyhus |
| 6,161,799 A | 12/2000 | Nyhus |
| 6,764,280 B2 | 7/2004 | Sehgal et al. |
| 7,097,169 B2 | 8/2006 | Mueller |
| 7,677,862 B2 | 3/2010 | Boatner |
| 7,789,341 B2 | 9/2010 | Arlton et al. |
| 8,047,792 B2 | 11/2011 | Bech et al. |
| 8,052,094 B2 | 11/2011 | Roesch |
| 8,052,500 B2 | 11/2011 | Van et al. |
| 8,070,090 B2 | 12/2011 | Tayman |
| 8,109,722 B2 | 2/2012 | Gamble et al. |
| 8,246,302 B2 | 8/2012 | Bertolotti |
| 8,262,358 B1 | 9/2012 | Muylaert et al. |
| 8,403,255 B2 | 3/2013 | Piasecki |
| 8,583,295 B2 | 11/2013 | Eglin et al. |
| 8,690,096 B2 | 4/2014 | Alvarez Calderon F. |
| 8,770,934 B2 | 7/2014 | Perkinson |
| 8,944,764 B2 | 2/2015 | Cardell et al. |
| 8,985,951 B2 | 3/2015 | Rauber et al. |
| 8,998,125 B2 | 4/2015 | Hollimon et al. |
| 9,126,681 B1 | 9/2015 | Judge |
| 9,334,049 B1 | 5/2016 | Legrand et al. |
| 9,828,095 B1 | 11/2017 | Wilcox et al. |
| 10,150,567 B2 | 12/2018 | Lauder et al. |
| 10,308,356 B2 | 6/2019 | Hampton et al. |
| 10,384,771 B2 | 8/2019 | Haldeman et al. |
| 10,392,098 B2 | 8/2019 | Baldwin et al. |
| 10,421,538 B2 | 9/2019 | Seale et al. |
| 10,473,107 B1 | 11/2019 | Newton et al. |
| 10,494,095 B2 | 12/2019 | Groninga et al. |
| 10,822,079 B2 | 11/2020 | Schwaiger |
| 10,960,974 B2 | 3/2021 | Muren et al. |
| 11,104,415 B2 | 8/2021 | Judas et al. |
| 11,167,845 B2 | 11/2021 | Schank |
| 11,186,363 B2 | 11/2021 | Lauder et al. |
| 11,203,422 B2 | 12/2021 | Buesing |
| 11,267,569 B2 | 3/2022 | Muren et al. |
| 11,312,484 B2 | 4/2022 | Bernard |
| 11,401,031 B2 | 8/2022 | Ensslin |
| 11,401,042 B2 | 8/2022 | Peleg |
| 11,433,093 B2 | 9/2022 | George |
| 11,472,538 B1 | 10/2022 | Skroski |
| 11,511,849 B2 | 11/2022 | Gazzino et al. |
| 11,511,854 B2 | 11/2022 | Baity et al. |
| 11,643,196 B1 | 5/2023 | Spira et al. |
| 11,673,659 B2 | 6/2023 | Howes et al. |
| 11,673,660 B1 | 6/2023 | Brookes |
| 11,814,161 B2 | 11/2023 | Andryukov et al. |
| 11,975,829 B2 * | 5/2024 | Sato ............... B64C 11/30 |
| 2002/0109044 A1 | 8/2002 | Rock |
| 2006/0102777 A1 * | 5/2006 | Rock ............... B64C 27/10 244/17.25 |
| 2006/0231677 A1 | 10/2006 | Zimet et al. |
| 2007/0031253 A1 | 2/2007 | Muren |
| 2010/0230547 A1 | 9/2010 | Tayman |
| 2011/0031355 A1 | 2/2011 | Alvarez |
| 2012/0012692 A1 | 1/2012 | Kroo |
| 2012/0257974 A1 | 10/2012 | Mok |
| 2012/0321472 A1 | 12/2012 | Davis et al. |
| 2014/0091172 A1 | 4/2014 | Arlton et al. |
| 2014/0265077 A1 | 9/2014 | Hinks |
| 2015/0003982 A1 | 1/2015 | Radovich et al. |
| 2015/0014475 A1 | 1/2015 | Taylor et al. |
| 2015/0226186 A1 | 8/2015 | Mitsch et al. |
| 2015/0314864 A1 | 11/2015 | Cserfoi |
| 2016/0059958 A1 * | 3/2016 | Kvitnevskiy ............ B64C 27/10 244/17.23 |
| 2016/0059960 A1 | 3/2016 | Fearn et al. |
| 2016/0090178 A1 | 3/2016 | Paynton |
| 2016/0236773 A1 | 8/2016 | Jolly et al. |
| 2016/0257399 A1 | 9/2016 | Carter et al. |
| 2016/0282140 A1 | 9/2016 | Bergelin et al. |
| 2017/0283051 A1 | 10/2017 | Radekopf et al. |
| 2017/0341733 A1 | 11/2017 | D'Anna et al. |
| 2018/0017040 A1 | 1/2018 | Lee |
| 2018/0257772 A1 | 9/2018 | Bernhardt |
| 2019/0002085 A1 | 1/2019 | Choi et al. |
| 2019/0016441 A1 | 1/2019 | Schank et al. |
| 2019/0047688 A1 | 2/2019 | Muren et al. |
| 2019/0047689 A1 | 2/2019 | Muren et al. |
| 2019/0118935 A1 | 4/2019 | Love et al. |
| 2019/0118943 A1 | 4/2019 | Machin et al. |
| 2019/0329882 A1 | 10/2019 | Baity et al. |
| 2019/0389569 A1 | 12/2019 | Paulson et al. |
| 2020/0148347 A1 | 5/2020 | Bevirt et al. |
| 2020/0331602 A1 | 10/2020 | Mikic et al. |
| 2020/0377209 A1 | 12/2020 | Schmaling et al. |
| 2020/0391860 A1 | 12/2020 | Foskey et al. |
| 2021/0114715 A1 | 4/2021 | Cravener et al. |
| 2021/0147091 A1 * | 5/2021 | Deloyer ............... B64U 30/20 |
| 2021/0221498 A1 | 7/2021 | Gallagher |
| 2021/0253231 A1 | 8/2021 | Ensslin |
| 2021/0284329 A1 | 9/2021 | Bernard |
| 2021/0339881 A1 | 11/2021 | Bevirt et al. |
| 2021/0354815 A1 | 11/2021 | Cravener |
| 2022/0119102 A1 | 4/2022 | Shaanan |
| 2022/0153407 A1 * | 5/2022 | Howes ............... B64D 27/24 |
| 2022/0274693 A1 * | 9/2022 | Sato ............... H02K 7/085 |
| 2022/0355923 A1 | 11/2022 | Andrews |
| 2023/0118750 A1 | 4/2023 | Baskin et al. |
| 2023/0339601 A1 * | 10/2023 | Marshall ............... B64C 27/52 |
| 2024/0092493 A1 | 3/2024 | Orbon et al. |

FOREIGN PATENT DOCUMENTS

| | | | |
|---|---|---|---|
| EP | 1944234 A1 * | 7/2008 | ............ B64C 27/10 |
| FR | 3074778 A1 | 6/2019 | |
| GB | 886582 A | 1/1962 | |
| GB | 2356616 A | 5/2001 | |
| RU | 2155702 C1 * | 9/2000 | |
| RU | 2709081 C1 * | 12/2019 | |
| WO | 2021030630 A2 | 2/2021 | |
| WO | 2022113086 A1 | 6/2022 | |
| WO | 2002086312 A1 | 10/2022 | |

OTHER PUBLICATIONS

Durkee, et al., "Conceptual Design of an Electric Helicopter Powertrain", IEEE, 2010, 6 pages.

Dvorak, "Teeter Bearing Help Wind Turbines SSSSSSSH", Windpower Engineering & Development (https://www.windpowerengineering.com/teeter-bearing-help-wind-turbines-ssssssssh/), Jul. 18, 2009, 5 pages.

Pavel, "Understanding tile control characteristics of electric vertical take-off and landing (eVTOL) aircraft for urban air mobility", Aerospace Scient and Technology, vol. 125, Jun. 12, 2021, 10 pages.

Shen, et al., "Muitibody Dynamics Mode! of a VTOL Teetering Rotor", AHS Aeromechanics Specialists Conference. 2010 (https://

(56) References Cited

OTHER PUBLICATIONS www.researchgate.net/publication/239590219_Multibody_Dynamics_Model_of_a_VTOL_Teetering_Rotor), Jan. 20, 2010, 8 pages.

\* cited by examiner

PROPULSOR ASSEMBLY OF AN ELECTRIC AIRCRAFT

FIELD OF THE INVENTION

The present invention generally relates to the field of propulsor assemblies. In particular, the present invention is directed to a propulsor assembly of an electric aircraft.

BACKGROUND

Propulsors on electric aircraft may experience adverse forces during flight. For example, these forces may include gusts of wind or force imbalances resulting from the different amounts of lift generated by the advancing and proceeding blades of a propulsor. Existing solutions are not sufficient to solve this issue.

SUMMARY OF THE DISCLOSURE

In an aspect, a propulsor assembly of an electric aircraft is described. The propulsor assembly includes an electric motor, the electric motor including a stator and a rotor. The assembly further including a propulsor mechanically connected to the rotor of the electric motor and a cyclic control assembly. The cyclic control assembly includes an actuator, wherein the actuator is an electric actuator, and a push rod, wherein the push rod is mechanically connected to the actuator and the propulsor, the push rod is configured to increase a blade angle of the propulsor when the push rod is displaced in a first direction, and the push rod is configured to decrease the blade angle of the propulsor when the push rod is displaced in a second direction.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a propulsor assembly including a cyclic control assembly. Cyclic control assembly may alter the flap angle and/or pitch angle of propulsor blades in order to compensate for unwanted forces. Cyclic control assembly may also provide greater ability of the pilot to control the electric aircraft.

Aspects of the present disclosure include a push rod that translates movement from a swashplate, to the propulsor of the electric aircraft. In some embodiments, push rod may extend through a rotor of an electric motor of the electric aircraft. This may decrease the drag generated by the cyclic control assembly. The swashplate may be actuated by an actuator. Movement of the swashplate may result in movement of the push rod, which may change the pitch and/or flap angle of propulsor blades.

Aspects of the present disclosure allow the propulsor assembly to include a flap mechanism. Flap mechanism may include a hinge for propulsor to rock back and forth on. In some embodiments, cyclic control assembly and/or flap mechanism may have a delta-3 angle that is not 90 degrees. This may allow for cyclic control assembly and/or flap mechanism to control the flap angle and pitch angle of a propulsor blade at the same time as flap angle and pitch angle are coupled together in this instance.

Figure 1:
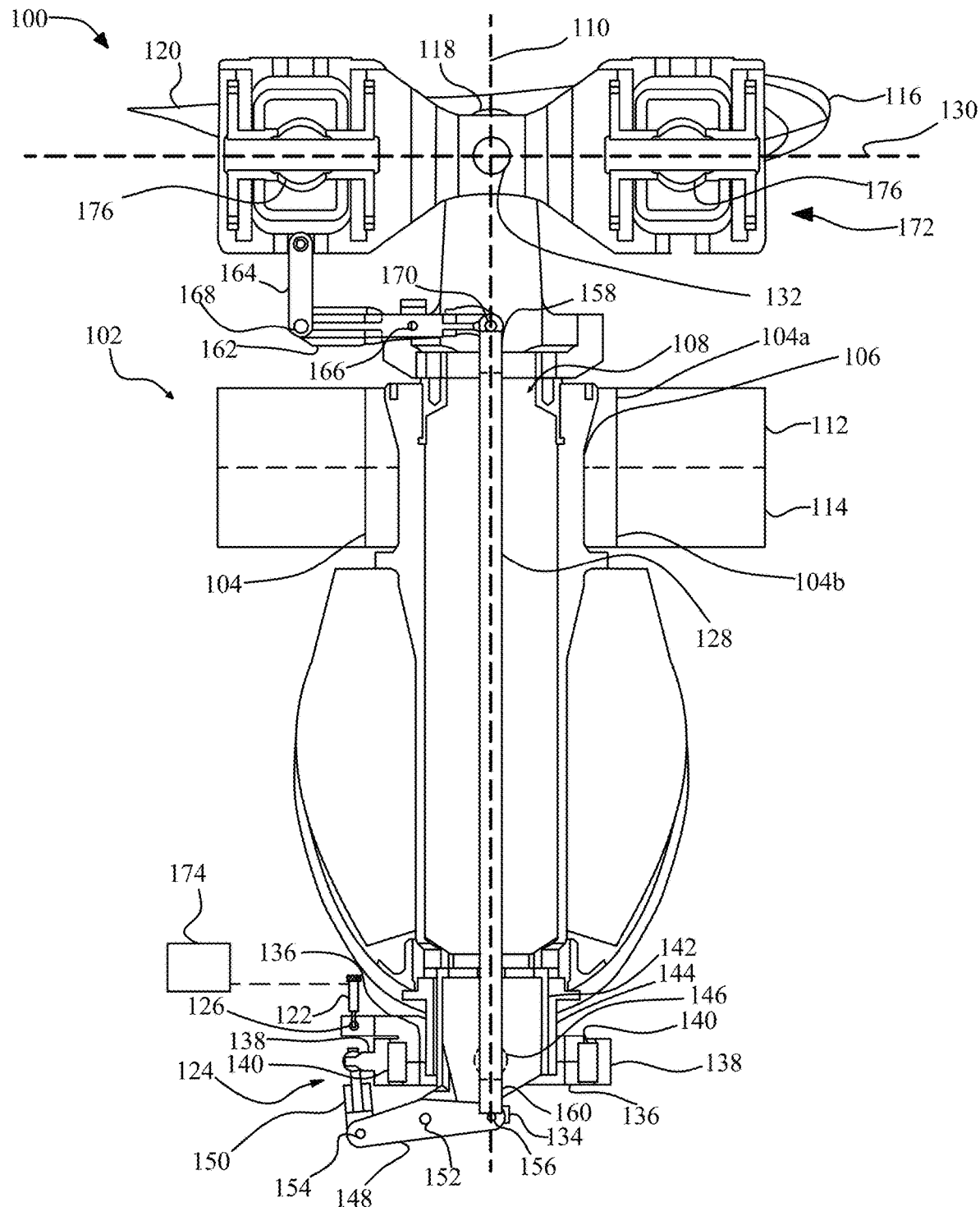
FIG. 1 is an illustration of an exemplary embodiment of a propulsor assembly of an electric aircraft.

Referring now to FIG. 1, an exemplary embodiment of a propulsor assembly 100 of an electric aircraft is illustrated. Assembly 100 includes an electric motor 102. An "electric motor," for the purposes of this disclosure, is a device that converts electrical energy into mechanical energy. Electric motor 102 may be driven by direct current (DC) electric power; for instance, a motor may include a brushed DC motor or the like. Electric motor 102 may be driven by electric power having varying or reversing voltage levels, such as alternating current (AC) power as produced by an alternating current generator and/or inverter, or otherwise varying power, such as produced by a switching power source. Electric motor 102 may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and the like.

With continued reference to FIG. 1, electric motor 102 includes a stator. For the purposes of this disclosure, a "stator" is a stationary portion of an electric motor. Electric motor 102 includes a rotor 104. A "rotor," for the purposes of this disclosure, is a rotating portion of an electric motor. As a non-limiting example, electric motor 102 may convert electrical energy into mechanical energy by rotating rotor 104. In some embodiments, rotor 104 may include a circular cross-section. In some embodiments, rotor 104 may include a hollow central portion.

With continued reference to FIG. 1, in some embodiments, rotor 104 may be connected to a shaft 106. For the purposes of this disclosure, a "shaft" is a mechanical element that is configured to rotate about its longitudinal axis. In some embodiments, shaft 106 may define a central lumen 108. For the purposes of this disclosure, a "lumen" is a cavity in a tubular element. For the purposes of this disclosure, a "central lumen" is a lumen that runs longitudinally down the center of a tubular element. As a nonlimiting example, shaft 106 may comprise a tubular element and a central lumen 108 running from a first end of the rotor to a second end. In some embodiments, rotor 104 may be a component of shaft 106.

With continued reference to FIG. 1, in some embodiments, electric motor 102 may be configured to rotate about a rotational axis 110. In some embodiments, rotational axis 110 may extend longitudinally through rotor 104. In some embodiments, rotational axis 110 may extend longitudinally through shaft 106. In some embodiments, rotational axis 110 may extend longitudinally through the central axis of central lumen 108.

With continued reference to FIG. 1, in some embodiments, electric motor 102 may include a plurality of electric motors. In some embodiments, electric motor 102 may include two electric motors. As a nonlimiting example, electric motor 102 may include a first electric motor 112 and a second electric motor 114. In some embodiments, first electric motor 112 may be consistent with electric motor 102 as described throughout this disclosure. In some embodiments, second electric motor 114 may be consistent with electric motor 102 as described throughout this disclosure. First electric motor 112 may comprise a stator consistent with the stator of electric motor 102. Second electric motor 114 may comprise a stator consistent with the stator of electric motor 102. In some embodiments, first electric motor 112 and second electric motor 114 may each include a rotor. The rotor of first electric motor 112 and second electric motor may be consistent with rotor 104 of electric motor 102. In some embodiments, first electric motor 112 and second electric motor 114 may include a shared rotor. Shared rotor may be consistent with rotor 104 of electric motor 102. In some embodiments, rotor of first electric motor 112 may be rotor 104a and/or rotor of second electric motor 114 may be rotor 104b. In some embodiments, first electric motor 112 and second electric motor 114 may each include a sprag clutch. Sprag clutch may allow first electric motor 112 to rotate shaft 106 even if second electric motor 114 is not functioning, or vice versa. As non-limiting examples, a sprag clutch may be located between rotor 104a and shaft 106 and/or rotor 104b and shaft 106. In some embodiments, electric motor 102 may be consistent with disclosure of motor in U.S. patent application Ser. No. 17/563,498, filed on Dec. 28, 2021 and titled "AN ELECTRIC AIRCRAFT LIFT MOTOR WITH AIR COOLING", which is incorporated by reference herein in its entirety.

With continued reference to FIG. 1, assembly 100 include a propulsor 116 mechanically connected to rotor 104 of electric motor 102. In some embodiments, propulsor 116 may be connected to rotor 104 using shaft 106. As a non-limiting example, shaft 106 may transmit rotational motion between rotor 104 and propulsor 116. A "propulsor", as used in this disclosure, is a component or device used to propel a craft by exerting force on a fluid medium, which may include a gaseous medium such as air or a liquid medium such as water. Propulsor 116 may include one or more propulsive devices. Propulsor 116 may include at least a lift propulsor. In an embodiment, propulsor 116 may include a thrust element. Front propulsors and/or rear propulsors of propulsor 116 may each be lift propulsors. In some embodiments, propulsor 116 may include a plurality of lift propulsors. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. Persons skilled in the art, upon reviewing the entirety of this disclosure, would appreciate, after having read the entirety of this disclosure, that various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. Persons skilled in the art, upon reviewing the entirety of this disclosure, will be aware of various devices that may be used as propulsor 116. In an embodiment, when a propulsor twists and pulls air behind it, it will, at the same time, push the aircraft forward with an equal amount of force. In an embodiment, when a propulsor twists and pulls air bellow it, it will, at the same time, push the aircraft upward with an equal amount of force. In an embodiment, thrust element may include a helicopter rotor incorporated into propulsor 116. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

With continued reference to FIG. 1, in some embodiments, propulsor 116 may include a hub 118. A "hub," for the purposes of this disclosure is a central portion of propulsor 116 to which propulsor blades connect. In some embodiments, propulsor 116 may include a plurality of blades 120. Blades 120 may be connected to and extend outward from hub 118. In an embodiment, propulsor 116 may include at least a blade 120. For the purposes of this disclosure, a "blade" is an element that extends outward from a hub of a propulsor and configured to generate a force when rotated about a rotational axis of the propulsor. In some embodiments, blade 120 may include an airfoil cross section. An "airfoil cross section," for the purposes of this disclosure, is a two-dimensional shape designed to produce an aerodynamic force when moved through a gas. As a non-limiting example, airfoil cross section may include a NACA airfoil. In some embodiments, the shape of the airfoil cross section may change as blade 120 progresses from root to tip. In some embodiments, plurality of blades 120 may include two blades 120. In some embodiments, plurality of blades 120 may include three blades 120. In some embodiments, plurality of blades 120 may include four blades 120. In some embodiments, plurality of blades 120 may include six blades 120. Plurality of blades 120 may be disposed symmetrically about hub 118. Plurality of blades 120 may be disposed at equal angles about hub 118. In some embodiments, blades 120 of plurality of blades 120 may be set at a fixed pitch, wherein blades 120 are not able to adjust their pitch while in flight. In some embodiments, blades 120 may be able to alter their pitch, such as through rotation. In some embodiments, propulsor 116 may comprise a monolithic propulsor 116. A "monolithic propulsor," for the purposes of this disclosure is a propulsor, wherein the blades and hub components are a singular unit.

With continued reference to FIG. 1, in some embodiments, propulsor 116 may include a lift propulsor. A "lift propulsor," for the purposes of this disclosure, is a propulsor that is configured to generate lift. For the purposes of this disclosure, "lift" is a force that is directed upwards. In some embodiments, propulsor 116 may include two lift propulsors. In some embodiments, propulsor 116 may include 4 lift propulsors. In some embodiments, propulsor 116 may include 8 lift propulsors.

With continued reference to FIG. 1, assembly 100 includes a cyclic control assembly. A "cyclic control assembly," for the purposes of this disclosure, is an assembly configured to alter the pitch of propulsor blades, such that each blade will have the same angle of incidence when they pass the same point in the cycle. Cyclic control assembly includes a first actuator 122.

With continued reference to FIG. 1, a first actuator 122 may include a component of a machine that is responsible for moving and/or controlling a mechanism or system. A first actuator 122 may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, a first actuator 122 responds by converting source power into mechanical motion. In some cases, a first actuator 122 may be understood as a form of automation or automatic control.

With continued reference to FIG. 1, in some embodiments, first actuator 122 may include a hydraulic actuator. A hydraulic actuator may consist of a cylinder or fluid motor that uses hydraulic power to facilitate mechanical operation. Output of hydraulic first actuator 122 may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in some embodiments, first actuator 122 may include a pneumatic first actuator 122. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, first actuator 122 is an electric actuator. In some embodiments, Electric first actuator 122 may include any of electromechanical actuators, linear motors, and the like. In some cases, first actuator 122 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric first actuator 122 may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

With continued reference to FIG. 1, in some embodiments, a first actuator 122 may include a mechanical first actuator 122. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

With continued reference to FIG. 1, in some embodiments, first actuator 122 may be attached to a fixed portion of an aircraft and swashplate 124. A "swashplate," for the purposes of this disclosure, is a mechanical device that translates input from flight controls to a propulsor, including at least translating input from flight controls to a cyclic control assembly. Translating input from flight controls to propulsor 116 may include receiving commands from a flight controller. In some embodiments first actuator may be attached to an actuator attachment point 126 of swashplate 124. For the purposes of this disclosure, an "actuator attachment point" is a component of cyclic control assembly that is configured to attach to and receive actuation from an actuator.

With continued reference to FIG. 1, cyclic control assembly include a push rod 128. A "push rod," for the purposes of this disclosure, is a mechanical linkage that transmits linear motion between an actuator and a propulsor. A "mechanical linkage," is a mechanical component that is configured to transmit motion and/or forces. Push rod 128, in some embodiments, may include a long, thin rod, wherein the rod's length is more than 5 times its thickness. Push rod 128 may be made from a variety of materials, including, but not limited to aluminum, titanium, and the like. Push rod 128 is mechanically connected to first actuator 122 and propulsor 116. For the purposes of this disclosure, "mechanically connected" refers to components that are connected by one or more mechanical components by way of mechanical linkages or fasteners.

With continued reference to FIG. 1, in some embodiments, the blade angle of propulsor 116 may be changed by the cyclic control assembly. "Blade angle," for the purposes of this disclosure, is an angular property of a blade of a propulsor. In some embodiments, blade angle may include a pitch angle. A "pitch angle," for the purposes of this disclosure, is the angle between the chord line of a blade of a propulsor and a reference plane containing a hub of the propulsor. In some embodiments blade angle may include a flap angle. A "flap angle," for the purposes of this disclosure, is the angle between a longitudinal axis of a blade of a propulsor and a reference plane containing a hub of the propulsor. For the purposes of this disclosure, "reference plane" is an axis passing horizontally through a propulsor hub when the propulsor is in its default position. In some embodiments, reference plane 130 may run from a tip of a first blade 120 to a tip of a second blade 120. An "increase" in blade angle occurs when propulsor 116 rotates in a clockwise direction about an axis going into the page in FIG. 1. A "decrease" in blade angle occurs when propulsor 116 rotates in a counterclockwise direction about an axis going into the page in FIG. 1. Clockwise and counterclockwise are defined with reference to FIG. 1. Push rod 128 is configured to increase a blade angle of propulsor 116 when push rod 128 is displaced in a first direction. First direction, in some embodiments, may be defined as a downwards direction. Push rod 128 is configured to decrease a blade angle of propulsor 116 when push rod 128 is displaced in a second direction. Second direction, in some embodiments, may be defined as an upwards direction. "Upwards" and "downwards" are defined with reference to FIG. 1. In some embodiments, push rod 128 may extend at least partially through central lumen 108. In some embodiments, push rod 128 may extend through the entirety of central lumen 108. Push rod 128 may run parallel to rotational axis 110 of propulsor 116. In some embodiments, rotational axis 110 may run through push rod 128. In some embodiments, increasing and/or decreasing blade angle of propulsor 116 may include changing pitch angle and/or flap angle of a blade 120 of propulsor 116.

With continued reference to FIG. 1, in some embodiments, propulsor 116 may include one or more pitch bearings 132. A "bearing," for the purposes of this disclosure is a mechanical element that constrains motion to a desired motion and reduces friction between moving parts. Pitch bearing 132 may allow propulsor 116 to rotate and alter the blade angle and/or blade angle of incidence. In a non-limiting example, in some embodiments, propulsor 116 may rotate about pitch bearing 132 to increase or decrease blade angle. In some embodiments, pitch bearing 132 may include a pivot bearing.

With continued reference to FIG. 1, in some embodiments, cyclic control assembly may include a second actuator 134. Second actuator 134 may be consistent with first actuator 122 as disclosed throughout this disclosure. Second actuator 134 may be mechanically connected to push rod 128. Second actuator 134 may be configured to deflect push rod 128. Second actuator 134 may be configured to rotate push rod 128 about a transverse axis. A "transverse axis," for the purposes of this disclosure, is an axis that traverses from side to side. As a non-limiting example, second actuator 134 may be configured to rotate push rod 128 about a transverse axis extending from side to side, wherein the transverse axis is defined with reference to the illustration in FIG. 1. Deflection of push rod 128 by second actuator 134 may alter a blade angle of incidence, by rotating the blades 120 of propulsor 116 about an axis extending from the tip of a first blade 120 to a tip of a second blade 120. For the purposes of this disclosure, a "blade angle of incidence" is the angle formed between the chord line of a propulsor blade and the airflow over the propulsor blade. The addition of this second actuator 134 may allow cyclic control assembly to control the propulsor 116 in two axes. As a non-limiting example, the addition of second actuator 134 may allow cyclic control assembly to control the blade angle and blade angle of incidence of propulsor 116.

With continued reference to FIG. 1, swashplate 124 may include an inner swashplate element 136 and an outer swashplate element 138. In some embodiments, outer swashplate element 138 may be configured to rotate with respect to inner swashplate element 136. Inner swashplate element 136 may be connected to first actuator 122. Inner swashplate element 136 may receive actuation from first actuator 122. Inner swashplate element 136 may be made from a metal, such as aluminum, titanium, and the like. Outer swashplate element 138 may be made from a metal, such as aluminum, titanium, and the like. Inner swashplate element 136 and outer swashplate element 138 may be made from a lightweight metal, such as aluminum, in order to realize weight savings. In some embodiments, a main swashplate bearing 140 may be located between inner swashplate element 136 and outer swashplate element 138. A "main swashplate bearing," for the purposes of this disclosure is a bearing that allows an outer swashplate element to rotate with respect to an inner swashplate element. In some embodiments, main swashplate bearing 140 may include a rolling bearing. As non-limiting examples, main swashplate bearing 140 may include a ball bearing, roller bearing, deep-grove ball bearing, self-aligning ball bearing, angular-contact ball bearing, thrust ball bearing, tapered roller bearing, spherical roller bearing, cylindrical roller bearing, needle roller bearing, and the like. In some embodiments, outer swashplate element 138 may be mechanically connected to rotor 104 and/or shaft 106 of electric motor 102. Outer swashplate element 138 may rotate about rotational axis 110. Outer swashplate element 138 may rotate at an equal speed to rotor 104 of electric motor 102.

With continued reference to FIG. 1, in some embodiments, assembly 100 and or swashplate 124 may include an inner housing 142 and/or an outer housing 144. Inner housing 142 and/or outer housing 144 may be cylindrical bodies. In some embodiments, inner housing 142 and/or outer housing 144 may be colinear with rotational axis 110. In some embodiments, inner housing 142 and/or outer housing 144 may be colinear with central lumen. In some embodiments, inner housing 142 and/or outer housing 144 may be colinear with rotor 104 and/or shaft 106 of electric motor 102. In some embodiments, inner housing 142 may be disposed within outer housing 144. Outer housing 144 may have a larger diameter than inner housing 142 such that inner housing 142 may fit within outer housing 144. Inner housing 142 and/or outer housing 144 contain a metal. In some embodiments, inner housing 142 and/or outer housing 144 contain a lightweight metal, such as, as non-limiting examples, aluminum, titanium, and the like. In some embodiments, inner housing 142 and/or outer housing 144 may contain plastic, carbon fiber, and the like. In some embodiments, inner housing 142 may be mechanically connected to rotor 104 and/or shaft 106 of electric motor. In some embodiments, inner housing 142 may be configured to rotate at a same rotational speed as rotor 104 of electric motor. In some embodiments, outer housing 144 may not be able to rotate—that is, outer housing 144 may be fixed.

With continued reference to FIG. 1, in some embodiments, swashplate 124 may be connected to a swashplate pivot bearing 146. A "swashplate pivot bearing," for the purposes of this disclosure, is a bearing that allows a swashplate to pivot with respect to a fixed body. In some embodiments, swashplate pivot bearing 146 may allow swashplate 124 to pivot with respect to outer housing 144. In some embodiments, swashplate pivot bearing 146 may allow swashplate 124 to pivot with respect to outer housing 144 and inner housing 142. In some embodiments, swashplate pivot bearing 146 may be located between outer housing 144 and inner swashplate element 136. In some embodiments, swashplate pivot bearing 146 may include a plurality of swashplate pivot bearings 146. As a nonlimiting example, swashplate pivot bearing 146 may include two swashplate pivot bearings 146. As non-limiting examples, swashplate pivot bearing 146 may include a cantilevered pivot bearing, flexural pivot bearing, and the like. In some embodiments, swashplate pivot bearing 146 may include a torsional spring. Torsional spring may bias swashplate pivot bearing 146 so that it returns to a neutral position. Swashplate shown in dashed lines in FIG. 1, because it is hidden from view in the depicted embodiment of assembly 100.

With continued reference to FIG. 1, in some embodiments, assembly 100 may include a swashplate rocker 148. As used in this disclosure, "swashplate rocker" is a component of a swashplate configured to rotate about a pivot point and transfer motion to a push rod. In some embodiments, swashplate rocker may mechanically connect push rod 128 to first actuator 122. In some embodiments, swashplate rocker may be mechanically connected to a swashplate link 150. For the purposes of this disclosure a "swashplate link" is a mechanical linkage connecting a component of a swashplate to a swashplate rocker. In some embodiments, swashplate link 150 may include metal. In some embodiments, swashplate link 150 may include a lightweight metal, such as, as non-limiting examples, aluminum, titanium, and the like. In some embodiments, swashplate link 150 may connect outer swashplate element 138 to swashplate rocker 148.

With continued reference to FIG. 1, in some embodiments, swashplate rocker 148 may be configured to rotate about a swashplate rocker pivot point 152. As a non-limiting example, swashplate rocker pivot point may include a pin. In some embodiments, swashplate rocker pivot point 152 may be attached to inner housing 142. In some embodiments, swashplate rocker may include a first swashplate rocker end 154 and a second swashplate rocker end 156. First swashplate rocker end 154 may connect to swashplate link 150. Second swashplate rocker end 156 may connect to push rod 128. First swashplate rocker end 154 and second swashplate rocker end 156 may be located on opposite sides of swashplate rocker pivot point 152.

With continued reference to FIG. 1, in some embodiments, swashplate rocker pivot point 152 may be located at a midpoint of swashplate rocker 148. As a non-limiting example, this may result in a downward displacement at first swashplate rocker end 154 being translated to an equal-in-magnitude upward displacement at second swashplate rocker end 156. In some embodiments, swashplate rocker pivot point 152 may be located offset from the midpoint of swashplate rocker 148. As a non-limiting example, swashplate rocker pivot point 152 may be located closer to first swashplate rocker end 154 than to second swashplate rocker end 156. This may, as a non-limiting example, result in a downward displacement at first swashplate rocker pivot point 152 being translated into a greater-in-magnitude upward displacement at second swashplate rocker pivot point 152. A person of ordinary skill in the art, after having reviewed the entirety of this disclosure, would appreciate that the placement of swashplate rocker pivot point 152 may be selected based on the amount of displacement provided by first actuator 122 and the amount of displacement desired in push rod 128. In some embodiments, swashplate rocker 148 may be configured to translate movement by first actuator 122 in a first actuation direction into movement of push rod 128 in the first direction. In some embodiment, swashplate rocker 148 may be configured to translate movement by first actuator 122 in a second actuation direction into movement of push rod 128 in the second direction.

With continued reference to FIG. 1, in some embodiments, push rod 128 may include an upper push rod link 158 and a lower push rod link 160. For the purposes of this disclosure a "push rod link" is a mechanical linkage, connecting a push rod to another element. Lower push rod link 160 may connect swashplate rocker 148 to push rod 128. In another embodiment, lower push rod link 160 may connect second swashplate rocker end 156 to push rod 128. In some embodiments, lower push rod link 160 may be pivotably connected to swashplate rocker 148.

With continued reference to FIG. 1, in some embodiments, assembly 100 may include a propulsor rocker 162. As used in this disclosure, "propulsor rocker" is a component of an element configured to rotate about a pivot point to transfer motion from a push rod to a propulsor. In some embodiments, propulsor rocker may mechanically connect push rod 128 to propulsor 116. In some embodiments, propulsor rocker 162 may be mechanically connected to a propulsor link 164. For the purposes of this disclosure a "propulsor link" is a mechanical linkage connecting a component of a propulsor to a propulsor rocker. In some embodiments, propulsor link 164 may include metal. In some embodiments, propulsor link 164 may include a lightweight metal, such as, as non-limiting examples, aluminum, titanium, and the like. In some embodiments, propulsor link 164 may connect propulsor 116 to propulsor rocker 162.

With continued reference to FIG. 1, in some embodiments, propulsor rocker 162 may be configured to rotate about a propulsor rocker pivot point 166. As a non-limiting example, propulsor rocker pivot point 166 may include a pin. In some embodiments, propulsor rocker 162 may include a first propulsor rocker end 168 and a second propulsor rocker end 170. First propulsor rocker end 168 may connect to propulsor link 164. Second propulsor rocker end 168 may connect to push rod 128. First propulsor rocker end 168 and second propulsor rocker end 170 may be located on opposite sides of propulsor rocker pivot point 166.

With continued reference to FIG. 1, in some embodiments, propulsor rocker pivot point 166 may be located at a midpoint of propulsor rocker 162. As a non-limiting example, this may result in a downward displacement at first propulsor rocker end 168 being translated to an equal-in-magnitude upward displacement at second propulsor rocker end 170. In some embodiments, propulsor rocker pivot point 166 may be located offset from the midpoint of propulsor rocker 162. As a non-limiting example, propulsor rocker pivot point 166 may be located closer to first propulsor rocker end 168 than to second propulsor rocker end 170. This may, as a non-limiting example, result in a downward displacement at first propulsor rocker pivot point 166 being translated into a greater-in-magnitude upward displacement at second propulsor rocker pivot point 166. A person of ordinary skill in the art, after having reviewed the entirety of this disclosure, would appreciate that the placement of propulsor rocker pivot point 166 may be selected based on the amount of displacement provided by push rod 128 and the amount of displacement desired in propulsor 116. In some embodiments, propulsor rocker 162 may be configured to translate movement by push rod 128 in a first direction to an increase in the blade angle of propulsor 116. In some embodiments, propulsor rocker 162 may be configured to translate movement by push rod 128 in a second direction to a decrease in blade angle of propulsor 116.

With continued reference to FIG. 1, upper push rod link 158 may connect propulsor rocker 162 to push rod 128. In another embodiment, upper push rod link 158 may connect second propulsor rocker end 170 to push rod 128. In some embodiments, upper push rod link 158 may be pivotably connected to propulsor rocker 162.

With continued reference to FIG. 1, in some embodiments, assembly 100 may include a flap mechanism 172. A "flap mechanism," for the purposes of this disclosure, is a mechanism configured to allow a propulsor to flap. Flap mechanism 172 may be mechanically connected to propulsor 116. In some embodiments, flap mechanism 172 may change the flap angle of blades 120 of propulsor 116. In some embodiments, flap mechanism 172 may be configured to passively control for in-flight transients. For the purposes of this disclosure, "in-flight transients" are transient forces on a propulsor that arise in flight. As a non-limiting example, in-flight transients may include gusts of wind. As a non-limiting example, in-flight transients may cause uneven forces on blades 120 of propulsor 116 resulting in a torque about hub 118 of propulsor 116 and rotor 104 of electric motor 102. This torque may lead to the failure of excessive wearing of components and is desirable to avoid. In some embodiments, flap mechanism 172 may be actively controlled by a flight controller 174. Flap mechanism 172 is further disclosed with reference to flapping assembly 300 of FIGS. 3, 4A, and 4B.

With continued reference to FIG. 1, in some embodiments, assembly 100 may include a flight controller 174. Flight controller 174 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. flight controller 174 may include a single computing device operating independently, or may include two or more computing device operating in concert, in parallel, sequentially or the like; two or more computing devices may be included together in a single computing device or in two or more computing devices. flight controller 174 may interface or communicate with one or more additional devices as described below in further detail via a network interface device. Network interface device may be utilized for connecting flight controller 174 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. flight controller 174 may include but is not limited to, for example, a computing device or cluster of computing devices in a first location and a second computing device or cluster of computing devices in a second location. flight controller 174 may include one or more computing devices dedicated to data storage, security, distribution of traffic for load balancing, and the like. flight controller 174 may distribute one or more computing tasks as described below across a plurality of computing devices of computing device, which may operate in parallel, in series, redundantly, or in any other manner used for distribution of tasks or memory between computing devices. flight controller 174 may be implemented using a "shared nothing" architecture in which data is cached at the worker, in an embodiment, this may enable scalability of assembly 100 and/or computing device.

With continued reference to FIG. 1, flight controller 174 may be designed and/or configured to perform any method, method step, or sequence of method steps in any embodiment described in this disclosure, in any order and with any degree of repetition. For instance, flight controller 174 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. flight controller 174 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in some embodiments, flight controller 174 may be communicatively connected to first actuator 122. In some embodiments, flight controller 174 may be communicatively connected to pilot controls. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, in some embodiments, flight controller 174 may command first actuator 122 to increase blade angle of propulsor 116. In some embodiment, flight controller 174 may be configured to command first actuator 122 to decrease blade angle of propulsor 116. Flight control system and method for assembly 100 may be further described in U.S. Nonprovisional patent application Ser. No. 18/129,483, filed on Mar. 31, 2023, and entitled "A SYSTEM FOR CONTROLLING A PROPULSOR ASSEMBLY OF AN ELECTRIC AIRCRAFT," the entirety of which is incorporated herein by reference. In some embodiments, flight controller 174 may receive signals from pilot controls and may control assembly 100 in response to those signals. Pilot controls are further described in U.S. patent application Ser. No. 18/090,278, filed on Dec. 22, 2022, and titled "HOVER AND THRUST ASSEMBLY FOR DUAL-MODE AIRCRAFT," the entirety of which is incorporated herein by reference. In some embodiments, first actuator 122 may be mechanically disconnected from pilot controls. For the purposes of this disclosure, first actuator 122 is mechanically disconnected from pilot controls if there is no mechanical reversion between first actuator 122 and pilot controls. "Mechanical reversion," for the purposes of this disclosure, is actuation using only mechanical means of one or more control elements of an aircraft.

With continued reference to FIG. 1, in some embodiments, flap mechanism 172 may include a teeter bearing 176. In some embodiments, flap mechanism 172 may include a plurality of teeter bearings 176. In some embodiments, flap mechanism 172 may include two teeter bearings 176. For the purposes of this disclosure, a "teeter bearing" is a bearing about which a propulsor is able to flap. Teeter bearings 176 may allow propulsor 116 to flap.

Figure 2:
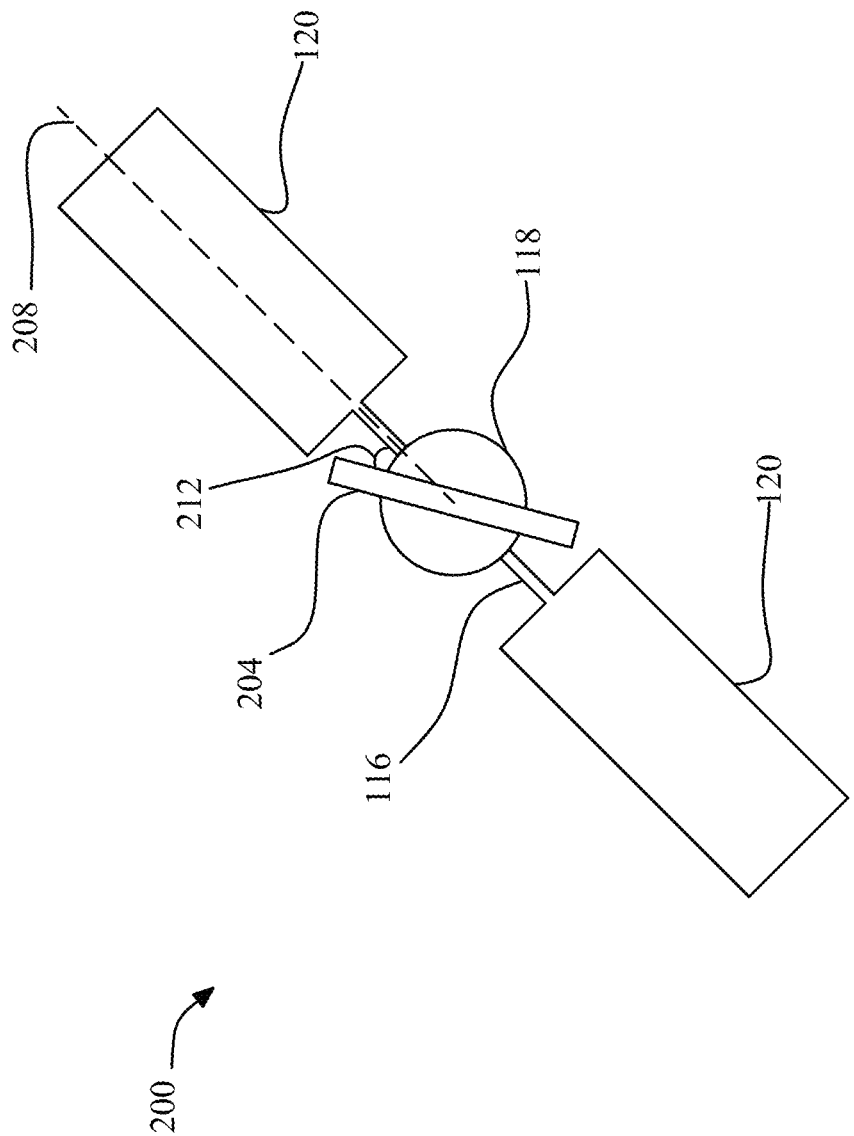
FIG. 2 is an illustration of a top-view of an exemplary embodiment of a propulsor assembly of an electric aircraft.

Referring now to FIG. 2, a top-view of an exemplary embodiment 200 of propulsor assembly 100 is illustrated. Embodiment 200 may include propulsor 116 and blades 120. Propulsor 116 may include hub 118. Embodiment 200 may include a hinge 204. hinge 204 may be consistent with hinge 336 disclosed with reference to FIG. 3. Propulsor 116 may include a propulsor axis 208. A "propulsor axis," for the purposes of this disclosure, is an axis that runs from a hub of a propulsor longitudinally down the length of a blade 120 to a blade tip. Embodiment 200 may include a delta-3 angle 212. For the purposes of this disclosure, a "delta-3 angle" is the angle between a hinge of a propulsor assembly and a blade of a propulsor.

With continued reference to FIG. 2, in some embodiments, delta-3 angle 212 may be equal to 90 degrees. When delta-3 angle 212 is 90 degrees, hinge 204 may purely control flap angle of propulsor. As a non-limiting example, when delta-3 angle 212 is 90 degrees, if hinge 204 allows propulsor 116 to deflect by 10 degrees, this will result in a flap angle of 10 degrees. In some embodiments, delta-3 angle 212 may be not equal to 90 degrees. In some embodiments, delta-3 angle 212 may be 20-70 degrees. In some embodiments, delta-3 angle 212 may be 30-60 degrees. In some embodiments, delta-3 angle 212 may be 30 degrees. In some embodiments, delta-3 angle 212 may be 45 degrees. When delta-3 angle 212 is not equal to 90 degrees, a deflection of propulsor 116 about hinge 204 will result in a change to both flap angle and pitch angle of blade 120 of propulsor 116. By using a delta-3 angle 212 that is not equal to 90 degrees, hinge 204 may control both flap angle and pitch angle, wherein flap angle and pitch angle are coupled.

With continued reference to FIG. 2, cyclic assembly (disclosed with reference to FIG. 1), may be implemented with a delta-3 angle 212 of 90 degrees. In some embodiments, cyclic assembly, may be implemented with a delta-3 angle 212 that is not 90 degrees. In some embodiments, cyclic assembly, may be implemented with any of the delta-3 angles 212 that are discussed above. When cyclic assembly is implemented at a delta-3 angle that is not 90 degrees, cyclic assembly may control both flap angle and pitch angle. As a non-limiting example, cyclic assembly may change blade angle about an axis that is 30 degrees offset from propulsor axis 208 of propulsor 116.

With continued reference to FIG. 2, in some embodiments, flap mechanism 172 (disclosed with reference to FIG. 1), may be implemented with a delta-3 angle 212 of 90 degrees. In some embodiments, flap mechanism 172, may be implemented with a delta-3 angle 212 that is not 90 degrees. In some embodiments, flap mechanism 172, may be implemented with any of the delta-3 angles 212 that are discussed above. When flap mechanism 172 is implemented at a delta-3 angle that is not 90 degrees, flap mechanism 172 may control both flap angle and pitch angle. As a non-limiting example, flap mechanism 172 may change blade angle about an axis that is 30 degrees offset from a propulsor axis 208 of propulsor 116.

Figure 3:
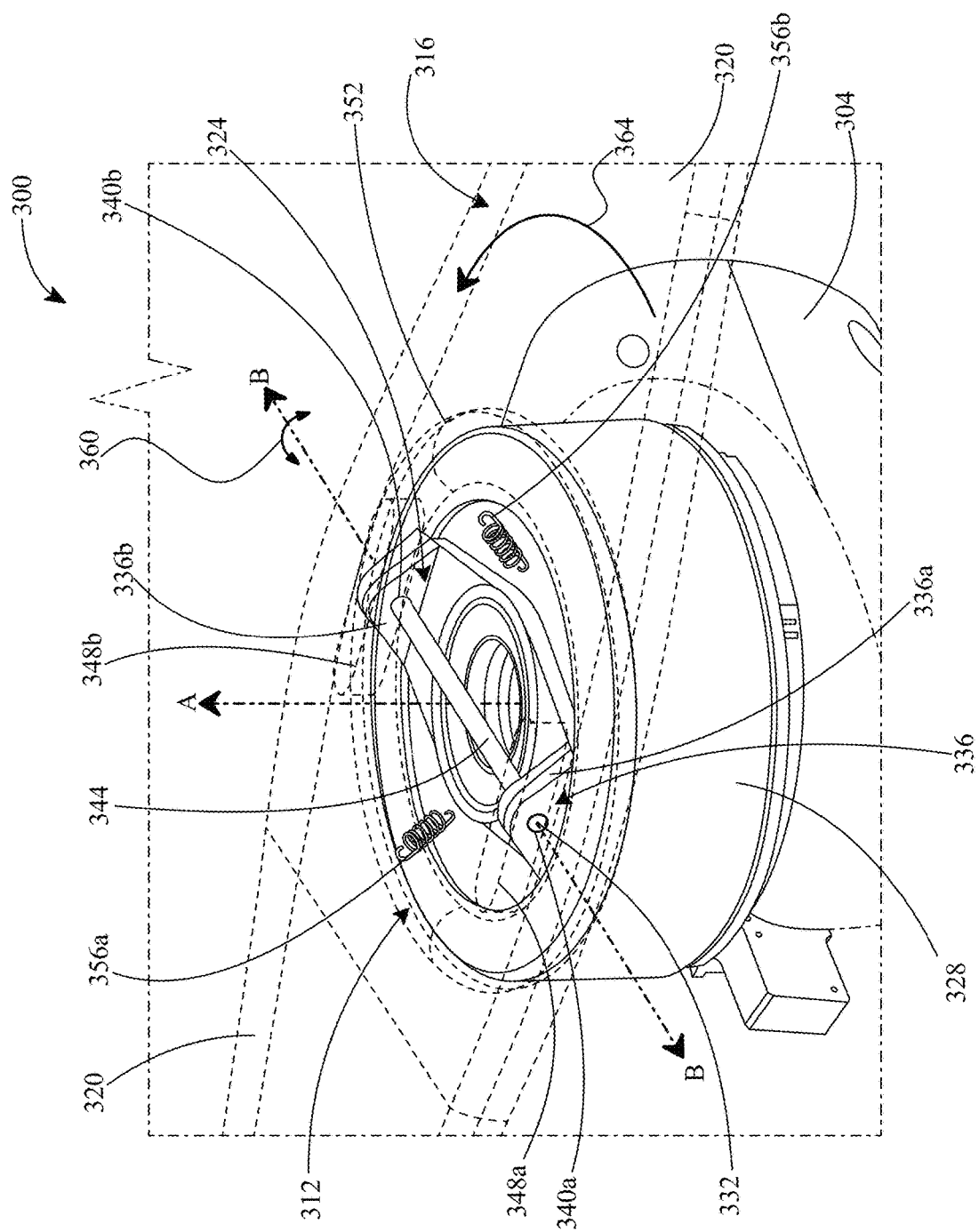
FIG. 3 is a schematic diagram illustrating an exemplary teetering propulsor assembly of an electric aircraft in accordance with one or more embodiments of the present disclosure.

Now referring to FIG. 3, an exemplary embodiment of a flapping assembly 300 of an electric aircraft 304 is illustrated. Electric aircraft 304 (also referred to herein as an "aircraft") may include an electrical vertical takeoff and landin3-g (eVTOL) aircraft (as shown in FIG. 1), unmanned aerial vehicles (UAVs), drones, rotorcraft, commercial aircraft, and/or the like. Aircraft 304 may include one or more components that generate lift, including, without limitation, wings, airfoils, rotors, propellers, jet engines, or the like, or any other component or feature that an aircraft may use for mobility during flight. Aircraft 304 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generates lift and propulsion by way of one or more powered propulsors connected to a motor, such as a quadcopter, multi-rotor helicopter, or other vehicle that maintains its lift primarily using propulsors that produce an upward thrust force by imparting downward velocity to the surrounding fluid.

Still referring to FIG. 3, in one or more embodiments, flapping assembly 300 (also referred to in this disclosure as a "propulsor assembly" or "propulsor") includes a propeller 316. Flapping assembly 300 may be consistent with aspects of teeter mechanisms disclosed in U.S. Nonprovisional patent application Ser. No. 17/852,229, filed on Jun. 28, 2022, and entitled "TEETERING PROPULSOR ASSEMBLY OF AN ELECTRIC VERTICAL TAKEOFF AND LANDING AIRCRAFT, Nonprovisional patent application Ser. No. 17/824,309, filed on May 25, 2022, and entitled "SYSTEMS AND DEVICES FOR PARKING A PROPULSOR TEETER," or Nonprovisional patent application Ser. No. 18/096,931, filed on Jan. 13, 2023, and entitled "A COMBINED CYCLIC AND TEETER SYSTEM FOR AN EVTOL AIRCRAFT," each of which are incorporated herein by reference. Propeller 316 may include one or more blades 320 that radially extend from a hub 312 of propeller 316. For example, and without limitation, propeller 316 may include a plurality of blades 320, where each blade 320 may extend from hub 312 in an opposite direction from another blade 320. In some embodiments, propeller 316 may be a monolithic component, where blades 320 and hub 312 are a singular unit (shown in FIGS. 2 and 3). For example, and without limitation, propeller may include a rigid, monolithic component. In other embodiments, propeller 316 may include multiple components, where blades 320 and hub 312 are assembled components that are fixedly and/or moveably attached. In one or more embodiments, hub 312 may be pivotably attached to a base 328 of assembly 300. Base 328 may be rotatably attached to electric vertical takeoff and landing aircraft 304 and configured to rotate about, for example, rotational axis A. Base 328, or at least a component of base 328, may rotate about axis A. Base 328 may be mechanically connected to a motor of assembly 300, either directly or indirectly, so that propulsor 316 may be driven by motor (shown in FIG. 6). In other embodiments, base 328 may include a motor and/or rotor of electric aircraft. In various embodiments, base 328 may be attached to or include a gearbox that translates mechanical movement from motor to propeller 316 so that propeller 316 may rotate about rotational axis A of propeller 316.

Figure 6:
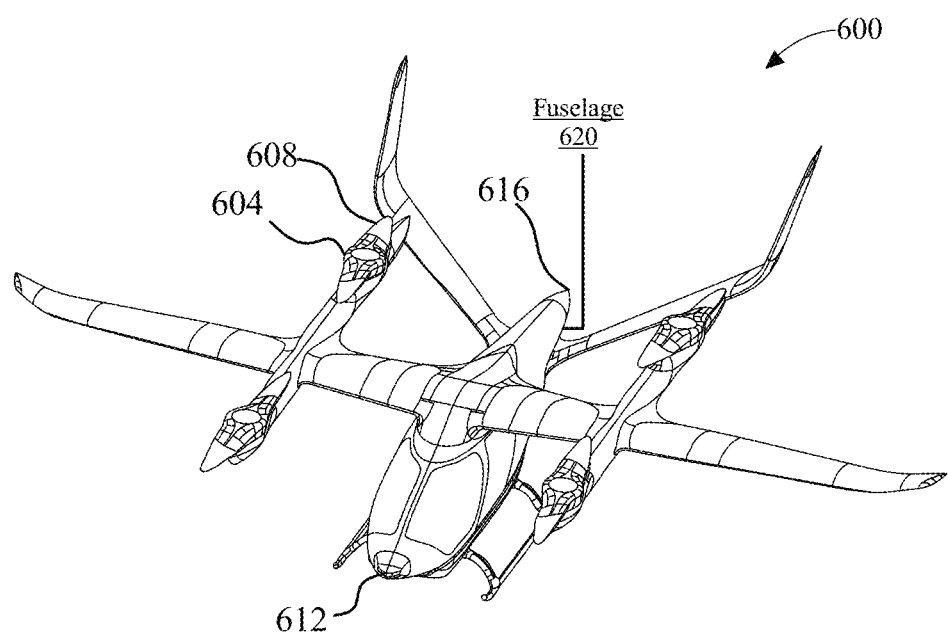
FIG. 6 is a diagrammatic representation of an exemplary embodiment of an aircraft.

Still referring to FIG. 3, in one or more embodiments, motor may be configured to power propeller 316. Motor may include a rotor, stator, motor shaft, and the like, as shown in FIG. 6. Motor may be at least partially disposed in an airframe of aircraft 304, such as a boom or a wing of aircraft 304. Assembly 300 may include motor, which translates electrical power from a power source of aircraft 304 into a mechanical movement of propeller 316. Rotor of motor may rotate about a central axis of motor.

Still referring to FIG. 3, in some embodiments, motor may include an electric motor. Electric motor may be driven by direct current (DC) electric power. As an example, and without limitation, electric motor may include a brushed DC electric motor or the like. An electric motor may be, without limitation, driven by electric power having varying or reversing voltage levels, such as alternating current (AC) power as produced by an alternating current generator and/or inverter, or otherwise varying power, such as produced by a switching power source. Electric motor may include, for example and without limitation, brushless DC electric motors, permanent magnet synchronous an electric motor, switched reluctance motors, induction motors, and the like. In addition to an inverter and/or a switching power source, a circuit driving electric motor may include electronic speed controllers (not shown) or other components for regulating motor speed, rotation direction, and/or dynamic braking. Motor may be used in an electric vehicle such as an electric automobile and an electric aircraft, including an electrical vertical takeoff and landing (eVTOL) aircraft, a commercial aircraft, an unmanned aerial vehicle, a rotorcraft, and the like. Motor may include the exemplary embodiment of propulsor assembly 604 discussed in reference to FIG. 6. Hub 312 of propeller 316 may be mechanically connected to rotor, directly or indirectly. For example, and without limitation, hub 312 may be connected to a motor shaft that is rotated by rotor. In some embodiments, motor may include a direct drive motor, wherein one rotation of rotor also causes one rotation of hub 312 and/or propeller 316. In other embodiments, motor may include an indirect drive motor where, for example, a gearbox, pulleys, bearing, and/or various other components facilitate movement of propeller 316 by motor. Propulsor assembly components may be consistent with disclosure of propulsor assembly components in U.S. patent application Ser. No. 17/563,498, filed on Dec. 28, 2021 and titled "AN ELECTRIC AIRCRAFT LIFT MOTOR WITH AIR COOLING", in U.S. patent application Ser. No. 17/732,791, filed on Apr. 29, 2022 and titled "MAGNETIC LOCKING SYSTEM OF AN ELECTRIC AIRCRAFT ROTOR AND METHODS THEREOF", in U.S. patent application Ser. No. 17/702,069, filed on Mar. 23, 2022 and titled "A DUAL-MOTOR PROPULSION ASSEMBLY", in U.S. patent application Ser. No. 17/704,798 filed on Mar. 25, 2022 and titled "ROTOR FOR AN ELECTRIC AIRCRAFT MOTOR", all of which are incorporated by reference herein in their entirety.

Still referring to FIG. 3, in some embodiments, assembly 300 may be used to propel aircraft 304 through a fluid medium by exerting a force on the fluid medium. In one or more non-limiting embodiments, assembly 300 may include a lift propulsor configured to create lift for aircraft 304. In other non-limiting embodiments, assembly 300 may include a thrust element, which may be integrated into the assembly 300. A thrust element may include any device or component that converts the mechanical energy of a motor, for instance in the form of rotational motion of a shaft, into thrust in a fluid medium. For example, a thrust element may include, without limitation, an impeller, a turbine, a pump-jet, a paddle or paddle-based device, and the like. As another non-limiting example, assembly 300 may include a six-bladed pusher propulsor, such as a six-bladed propeller mounted behind the motor to ensure the drive shaft is in compression. Persons skilled in the art, upon reviewing the entirety of this disclosure, will be aware of various devices that may be used as assembly 300. In various embodiments, when a propeller of assembly 300 twists and pulls air behind it, it will, at the same time, push aircraft 304 with a relatively equal amount of force. The more air pulled behind aircraft, the more aircraft is pushed forward. In various embodiments, propeller 316 of assembly 300 may be substantially rigid and not susceptible to bending during flight.

Still referring to FIG. 3, assembly 300 may be a lift propulsor oriented such that a rotation plane C (shown in FIGS. 4A and 4B) of propeller 316 is parallel with a ground supporting aircraft 304 when aircraft 304 is landed. As used in this disclosure, a "rotation plane" (also referred to herein as a "plane of rotation") is a plane in which a propeller rotates. Rotation plane may be relatively orthogonal to an axis of rotation of propeller 316, such as axis A. A circumference of a rotational plane may be defined by a rotational path of a tip of blade 320 of propeller 316. As understood by one skilled in the art, assembly 300 may include various types of pitch-flap couplings, where hinge 336 may be oriented in various positions relative to rotation plane C. For instance, and without limitation, axis B may be at an angle relative to rotation plane C. For example, and without limitation, axis B may be perpendicular to rotation plane C.

In another example, and without limitation, axis B may be at a non-perpendicular angle relative to rotation plane C. When there is a substantial force exerted on propulsor 316 that is orthogonal to rotational axis A, such as air resistance during edgewise flight, the force may cause significant stress and strain on propeller 316 and/or assembly 300. Edgewise flight (exaggerated for explanation) may occur when an aircraft is traveling in a direction orthogonal to a rotational axis of a propeller and parallel to a rotation plane of the propeller, causing an air stream to be directed at an edge of the propeller. Edgewise flight may also occur when an aircraft is traveling in a direction in which a component of the velocity of the aircraft is in a direction orthogonal to a rotational axis of a propulsor and parallel to rotation plane. Edgewise flight may cause issues with aircraft 304. For example, edgewise flight may cause excessive flapping of blades 320 during flight including flapping angulation. Thus, edgewise flight may lead to inadvertent displacement of propeller 316 that creates excessive loads on a propulsor assembly and/or components thereof.

Still referring to FIG. 3, assembly 300 includes a passive flap 324 mechanically connected to hub 312 of propeller 316, where passive flap 324 is configured to permit propeller 316 to pivot about a pivot point 332 of passive flap 324 (as indicated by directional arrow 360). Passive flap 324 may allow for deflections of propeller 316 during a transition of flight modes or edgewise flight to reduce the issues discussed above caused by edgewise flight. Passive flap 324 allow a rigid propeller to pivot relative to the rest of propulsor assembly. Passive flap 324 facilitates a certain amount of up-and-down tip, or blade displacement, per rotation of propeller 316 to reduce a load experienced by hub 312 and/or assembly 300, thus making assembly 300 more robust, especially against strong winds and dynamic operations of aircraft 304. Passive flap 324 may attach hub 312, and thus propeller 316, to base 328. In some embodiments, base 328 may be fixedly attached to a shaft, such as a motor shaft or a shaft of gearbox, which rotates propeller 316 about rotational axis A when motor is running (as indicated by directional arrow 364). Passive flap 324 may include one or more pivot points 332 so that propeller 316 may teeter about a pivot point. In one or more embodiments, when propeller 316 teeters about pivot point 332, rotation plane of propeller 316 may shift so that an orientation of rotation plane may vary relative to aircraft 304. In some embodiments, flapping assembly 300 may be configured to allow propulsor 316 to rotate about a pivot point 332 of assembly 300.

Still referring to FIG. 3, in one or more embodiments, passive flap 324 may include a hinge 336 that connects base 328 and hub 312 of propeller 316, where hinge 336 is configured to allow propeller 316 to rotate about a pivot point 332. Hinge 336 may provide pivot point 332 on which propeller 316 may teeter and/or tilt. Hinge 336 may be attached to base 328. As understood by one of ordinary skill in the art, hinge 336 may be various shapes and sizes without altering the spirit or the scope of this disclosure. In some embodiments, hinge 336 may be a circular or semi-circular shape. In some embodiments, hinge 336 may be a triangular shape (as shown). In other embodiments, hinge 336 may include a curved corner extending from base 328 and may form a fulcrum on which propeller 316 may teeter. Hinge 336 may include an aperture 340 through which a rod 344 may be disposed therethrough. Rod 344 may have a longitudinal axis B that propeller 316 may rotate about to teeter. In one or more embodiments, axis B may be parallel to a span, or tip-to-tip, axis of propeller 316. In other embodiments, axis B may not be perpendicular to the span axis of propeller 316.

Still referring to FIG. 3, in one or more embodiments, hinge 336 may include two opposing hinges, one hinge on either side of axis A and either end of axis B. For instance, and without limitations, hinge 336 may include a pair of hinges, such as a first hinge 336a and a second hinge 336b. Each hinge 336a,b may include an aperture that is disposed therein, such as first aperture 340a and second aperture 340b, respectively. Rod 344 may traverse through each aperture 340a,b. For example, and without limitation, a first end of rod 344 may be disposed within aperture 340a, and a second end of rod 344 may be disposed within aperture 340b. Rod 344 may run through each aperture 340a,b in each hinge 336a,b to connect hub 312 to base 328. In one or more embodiments, rod may be fixedly connected to hub 312. In some embodiments, rod 344 may include an integrated component of hub 312. In other embodiments, rod 344 may include a separate component from hub 312 that may be attached to hub 312. In some embodiments, rod 344 may include two separate rods, where a first rod 344 may run through first aperture 340a of first hinge 336a and attach to hub 312 on either or both sides of first hinge 336a, and a second rod 344 may run through second aperture 340b of second hinge 336b and attach to hub 312 on either or both sides of second hinge 336b. Hub 312 may be attached to base 328 using hinges 336a,b so that if base 328, or at least a portion of base 328, moves (e.g., rotates), hub 312 may be moved in conjunction with base 328.

Still referring to FIG. 3, in one or more embodiments, hub 312 may include one or more recesses 348. Recess 348 may include a cavity or depression in an underside surface of hub 312 and/or propeller that faces base 328. Recess 348 may at least partially receive hinge 336 such that at least a portion of hinge 336, such as curved corner, is disposed within recess 348. In some embodiments, recess 348 may contact hinge 336, such as, for example, a rounded edge of hinge 336. Recess 348 may include a plurality of recesses, such as a recess 348a,b that each hinge 336a,b, respectively, may be disposed at least partially within. In some embodiments, a surface of hinge 336, such as a curved surface, may form a fulcrum against recess 348. In some embodiments, hinge 336 may be spaced from recess 348, and hinge 336 and recess 348 may be separated by a gap. In one or more embodiments, hub 312 may include a track 352 that forms a groove within surface of hub 312 that is facing base 328. Track 352 may provide space between hub 312 and base 328, where at least a portion of base 328 may be received by track 352. Thus, track 352 allows for propeller 316 to rotate and/or teeter without impediment from base 328. A shape of track 352 may be complementary to a shape of base 328. For example, and without limitation, shapes of track 352 may include a dome, half toroid, and the like.

Still referring to FIG. 3, in one or more embodiments, passive flap 324 may include one or more centering springs 356. Centering spring 356 (also referred to herein as a "spring") may provide resistance in teetering movement of propeller 316. For example, and without limitation spring 356 may be configured to prevent or reduce teetering of propulsor 316. In some embodiments, centering spring 356 may have a spring constant large enough to prevent propulsor 316 from teetering about longitudinal axis B when the propulsor 316 rotates at a rate of approximately 30 Hertz or less. Centering spring may include a plurality of springs, where at least a first centering spring 356a is on a first side of longitudinal axis B and at least a second centering spring 356b is on a second side of longitudinal axis B. In one or more embodiments, centering spring 356 may be attached to base 328 at a proximal end of spring 356 and centering spring 356 may be attached to hub 312 at a distal end of spring 356. Though spring 356 is shown as a helical spring, as understood by one of skill in the art, spring 356 may be various other types of springs and/or any combination thereof. For example, and without limitation, spring 356 may include a compression spring, extension spring, torsion spring, constant force spring, constant rate spring, progressive rate spring, dual rate spring, linear spring, laminated or leaf spring, coil or helical spring, conical spring, flat spring, machined spring, molded spring, disc or Belleville spring (e.g., single or stacked), wave springs, and the like. Spring 356 may be position at various orientations. For example, and without limitation, a longitudinal axis of spring 356 may be angled relative to a connecting surface of base 328 and/or hub 312. In another example, and without limitation, the longitudinal axis of spring 356 may be orthogonal to a connecting surface of base 328 and/or hub 312. In one or more embodiments, assembly 300 may include a second motor and a second propeller driven by the second motor. The second propeller may include a second hub, a second plurality of blades extending from the hub, where the second hub is configured to rotate about a second rotational axis, and a second passive flap connected to the second hub. The second passive flap may include a second base rotatably affixed to the electric vertical takeoff and landing aircraft and configured to rotate about the second rotational axis, and a second hinge connecting the base and the hub of the propeller and configured to allow the propeller to pivot about a pivot point relative to the second base.

Still referring to FIG. 3, assembly 300 may include a locking mechanism (not shown) configured to lock passive flap 324, thereby preventing propeller 316 from teetering about longitudinal axis B. When locking mechanism is engaged, propulsor plane is fixed at an orientation orthogonal to rotational axis A. Locking mechanism may be configured to engage and/or disengage during flight of aircraft 304. For example, and without limitation, locking mechanism may be disengaged when aircraft 304 is performing a vertical takeoff and/or a vertical landing and engaged when the aircraft 304 is in fixed-wing flight. In some embodiments, locking mechanism may include a plurality of springs, where each spring is attached to hub 312 at a first end of the spring and attached to base 328 at a second end of the spring. In some embodiments, locking mechanism may include a spring on either side of longitudinal axis B. Locking mechanism may include a plurality of springs on either side of longitudinal axis B. Springs may have a spring constant large enough to prevent teetering of propeller 316 when propeller 316 rotates ten or fewer revolutions per second.

For instance, and without limitation, springs may each have an initial tension that provides an internal force large enough to prevent extension of spring unless a substantial load or external force is applied. For example, and without limitation, springs may have a spring constant that prevent propulsor 316 from teetering on passive flap 324 except during forces caused by a rotation of propulsor 316 during operation of aircraft 304 in edgewise flight. In some embodiments, locking mechanism may include spring 356, where spring 356 may have a spring constant large enough to prevent propulsor 316 from teetering about longitudinal axis B when the propulsor 316 is rotating at a lower speed, such as less than 30 Hertz. In some embodiments, locking mechanism may be engaged or disengaged by an actuator. Actuator may be controlled by a controller, such as a computing device, as discussed further in FIG. 8. Controller may be communicatively connected to actuator and/or locking mechanism. In various embodiments, actuator may be configured to retract to essentially stiffen spring, which may engage locking mechanism. Actuator may be configured to extend to essentially loosen spring, which may disengage locking mechanism. Controller may adjust a position of actuator and alter a maximum rotational speed of propeller 316 in which locking mechanism is engaged and prevents propeller 316 from teetering about longitudinal axis B by an undesirable amount or completely. Controller may be communicatively connected to locking mechanism. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Controller may be configured to engage and/or disengage locking mechanism. For example, controller may disengage locking mechanism to unlock passive flap 324 when aircraft 304 performs a vertical takeoff and engage the locking mechanism, thereby locking passive flap 324, when the aircraft 304 is in fixed-wing flight. Transition between flight modes of an electric aircraft may be consistent with disclosure of U.S. patent application Ser. No. 17/563,498 filed on Dec. 28, 2021 and titled "AN ELECTRIC AIRCRAFT LIFT MOTOR WITH AIR COOLING," and of U.S. patent application Ser. No. 17/825,371 filed on May 26, 2022 and titled "AN APPARATUS FOR GUIDING A TRANSITION BETWEEN FLIGHT MODES OF AN ELECTRIC AIRCRAFT," all of which is incorporated by reference herein in its entirety.

Still referring to FIG. 3, in some embodiments, controller may include any computing device as described in this disclosure, including without limitation a microcontroller, processor, microprocessor, digital signal processor (DSP), and/or system on a chip (SoC) as described in this disclosure. Computing device may include, be included in, and/or communicate with a mobile device such as a mobile telephone or smartphone. Controller may include a single computing device operating independently, or may include two or more computing device operating in concert, in parallel, sequentially or the like; two or more computing devices may be included together in a single computing device or in two or more computing devices. Controller may interface or communicate with one or more additional devices as described below in further detail via a network interface device. Network interface device may be utilized for connecting controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller may include but is not limited to, for example, a computing device or cluster of computing devices in a first location and a second computing device or cluster of computing devices in a second location. Controller may include one or more computing devices dedicated to data storage, security, distribution of traffic for load balancing, and the like. Controller may distribute one or more computing tasks as described below across a plurality of computing devices of computing device, which may operate in parallel, in series, redundantly, or in any other manner used for distribution of tasks or memory between computing devices. Controller may be implemented using a "shared nothing" architecture in which data is cached at the worker, in an embodiment, this may enable scalability of assembly 300 and/or computing device.

Still referring to FIG. 3, controller may be designed and/or configured to perform any method, method step, or sequence of method steps in any embodiment described in this disclosure, in any order and with any degree of repetition. For instance, controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4A:
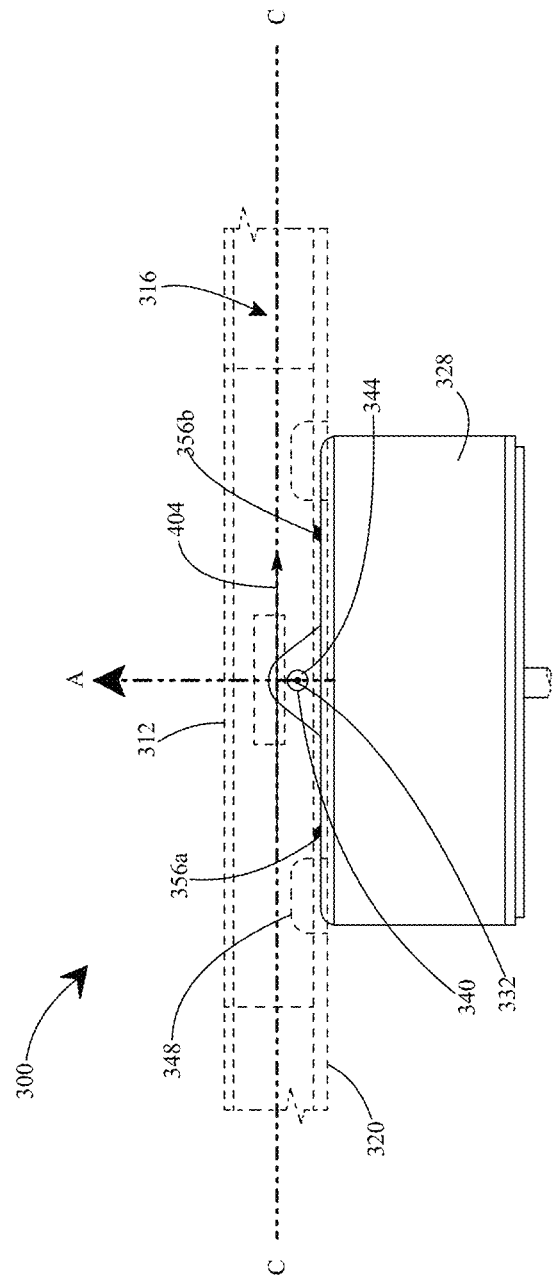
FIGS. 4A-B are a set of schematic diagrams illustrating an exemplary movement of teetering propulsor assembly in accordance with one or more embodiments of the present disclosure.
Figure 4B:
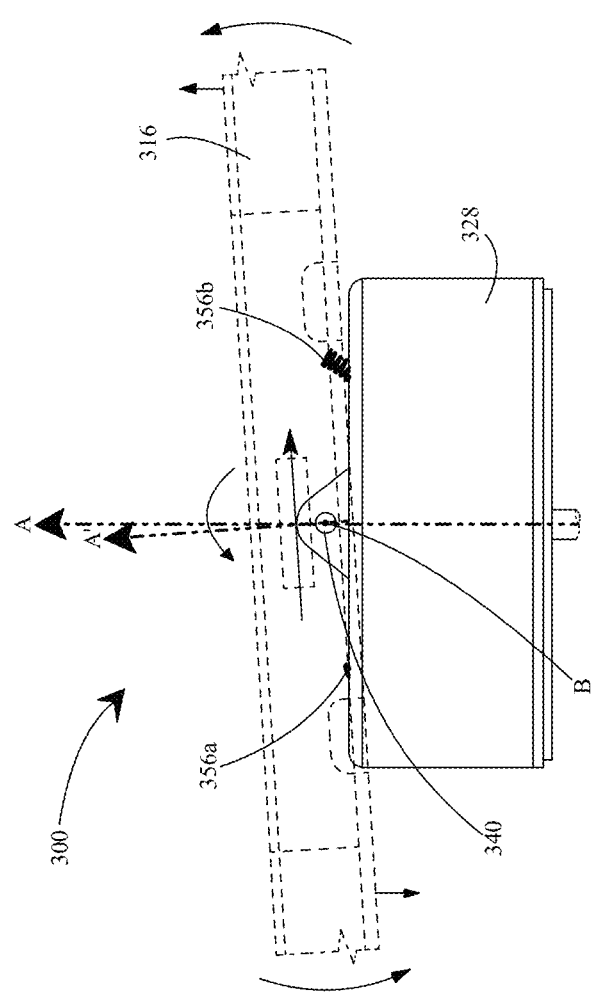

Referring now to FIGS. 4A and 4B, an exemplary movement of flapping assembly 300 is illustrated. As shown in FIG. 4A, propeller 316 may have a rotational axis A that is in an initial position. In some embodiments, initial position of axis A may be predetermined by a manufacturer or user of aircraft 304. In some embodiments, in initial position, propeller 316 may share a rotational axis with base 328 when propeller is not pivoting about axis B. For example, and without limitation, propeller 316 may share a rotational axis with a shaft of base 328, gearbox, or motor that facilitates rotation of propeller 316. When propeller 316 is not pivoting, springs 356 may both be in a resting and/or initial position. For example, and without limitation, in a resting position, each spring 356a,b may be of a relatively equal length relative to the other spring 356b,a.

As shown in FIG. 4B, rotational axis of propeller 316 may move to a second position, as indicated by rotational axis A, as propeller 316 teeters and/or tilts relative to aircraft 304. In an exemplary embodiment, propeller 316 may not share a rotational axis with base 328 when propeller 366 is pivoting about axis B. For instance, and without limitation, rotational axis A of propeller 316 is not parallel to a rotational axis of base 328. When propeller 316 is pivoting, springs 356 may be in a displaced position. For example, and without limitation, in a displaced position, a length of each spring 356a,b may vary relative to the other spring 356b,a. A displaced position of spring 356 may include a position that places spring 356 in tension or compression. In a non-limiting embodiment, during teetering of propeller 316, first spring 356a may compress while second spring 356b may simultaneously extend, which allows propeller 316 to tilt relative to base 328, resulting in deflections of propeller 316 to reduce strain experienced by hub 312 and/or assembly 300.

Figure 5A:
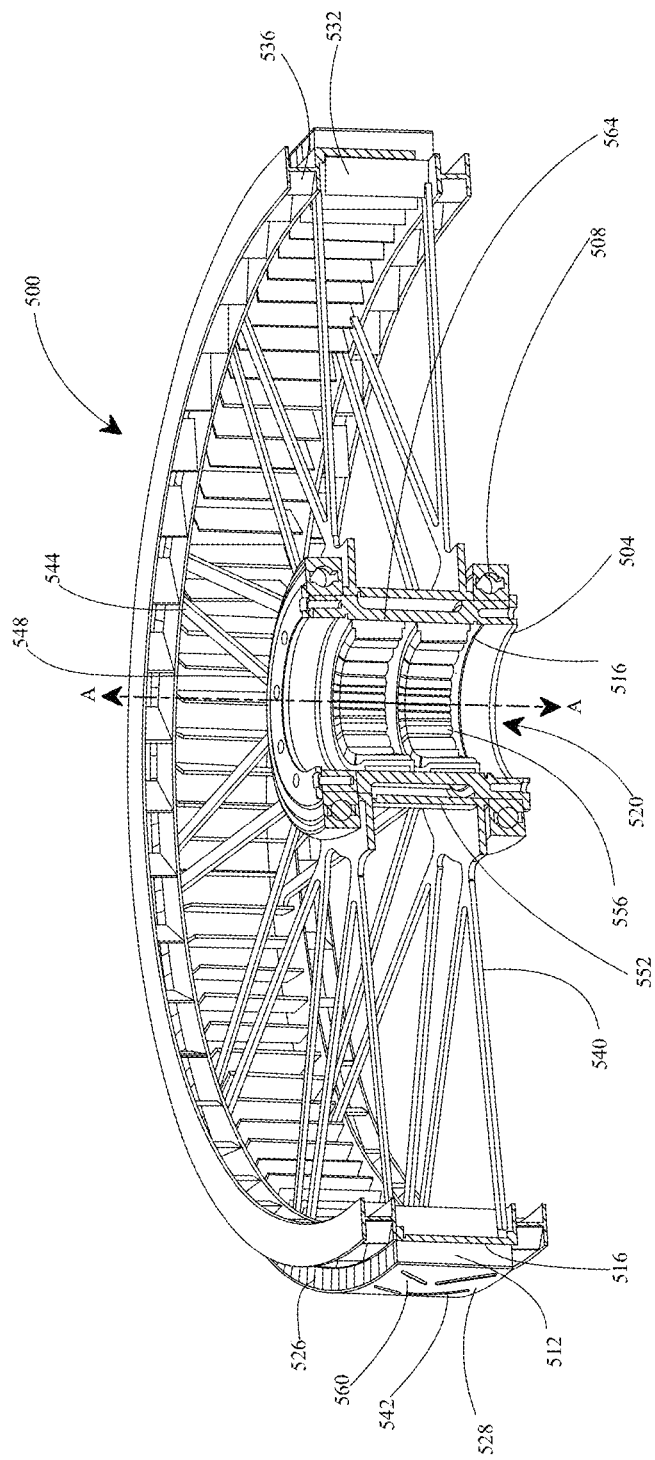
FIGS. 5A-B are illustrations showing cross-sectional views of an exemplary embodiment of a rotor for an electric aircraft motor in one or more aspects of the present disclosure.
Figure 5B:
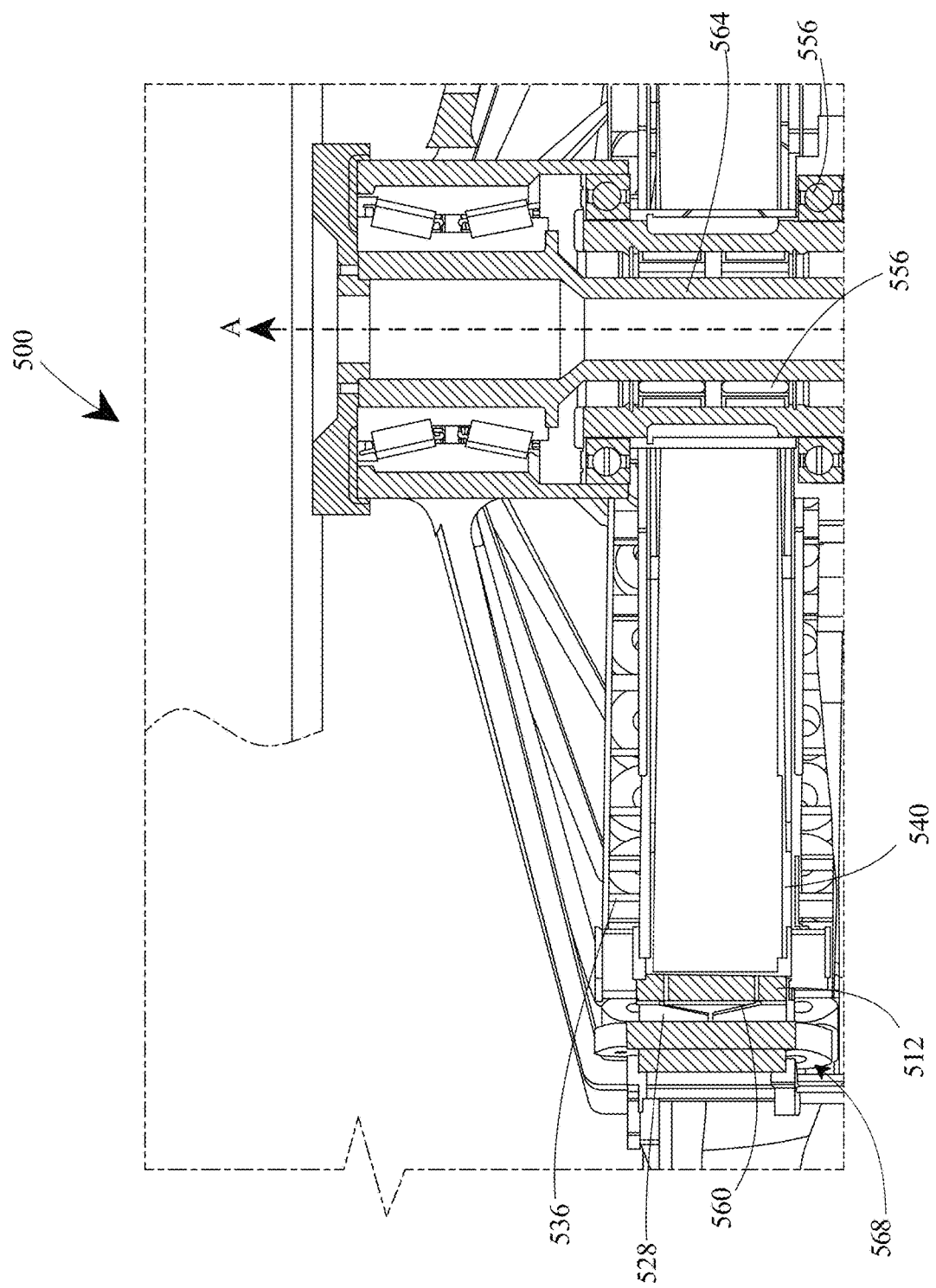

Referring now to FIGS. 5A and 5B, cross-sectional views of an exemplary embodiment of a rotor 500 of a motor of an electric aircraft are shown in accordance with one or more embodiments of the present disclosure. In one or more embodiments, rotor 500 includes a hub 508. Hub 508 may be a tubular structure. As used herein, a "hub" is a component that holds the propulsor. Hub 508 may be consistent with any hub as discussed herein. In one or more embodiments, inner surface 516 may define a lumen 520. Lumen 520 may be a longitudinal cavity that receives a rotor shaft 564. Shaft 564 may be disposed within lumen 520 of hub 508 so that rotor 500 may rotate and simultaneously rotate shaft 564 which in turn rotates a propulsor. As used in this disclosure, a "lumen" is a central cavity, for example a tubular or cylindrical bore.

Still referring to FIGS. 5A and 5B, and in one or more embodiments, hub 508 may comprise an inner hub 504 and an outer hub 552. In one or more embodiments, outer hub 552 may be attached to a proximal end 548 of spokes 540 of rotor 500, as discussed further below. In one or more embodiments, inner hub 504 may be secured to outer hub 552 using a locking mechanism. A locking mechanism may be configured to removably attach sprag 556 to hub 508. A locking mechanism may include a bolted joint, dowels, key, spline, and the like. In one or more embodiments, the inner hub may include a sprag clutch 556, as discussed in more detail below.

Still referring to FIGS. 5A and 5B, and in one or more embodiments, rotor 500 includes a sprag 556. Sprag 556 may be disposed within inner hub 504. For example, and without limitation, sprag 556 may be attached to an inner surface 516 of inner hub 504. Sprag 556 may engage a rotor shaft (not shown) which allow for the rotational movement of rotor to be translated into a mechanical movement of, for example, a propulsor. Sprag 556 may include a sprag clutch. In one or more embodiments, sprag 556 may have a cage design, so that the sprags are less likely to lay down due to centrifugal force experienced when rotor is spinning. In one or more embodiments, sprag clutch 556 may include a maximum eccentricity of 90 microns.

Still referring to FIGS. 5A and 5B, rotor 500 includes a hoop 526 concentrically positioned about hub 508. Hoop 526 may share a central axis A with hub 508. In one or more embodiments, hoop 526 includes magnets 512, which are position along an outer circumference of hoop 526 and attached to an outer surface of hoop 526. As used herein, a "magnet" is a material or object that produces a magnetic field. As used herein, a "hoop" is a cylindrical component. In one or more embodiments, a current may flow through a plurality of windings of a stator 568 that then results in the generation of electrically-induced magnetic fields that interact with magnets 512 to rotate rotor 500 about central axis A. As used herein, a "stator" is a stationary portion of a motor. During operation, rotor 500 may rotate axially about central axis A while stator remains still; thus, rotor 500 is rotatable relative to stator.

Still referring to FIGS. 5A and 5B, and in one or more embodiments, magnets 512 of hoop 526 may be permanent magnets fixed to outer surface 560. Magnets 512 may be arranged concentrically to a central axis A of rotor 500. Thus, magnets 512 may be arranged in a ring along the outer circumference of hoop 526, which is defined by outer surface 560 of hoop 526. Magnets 512 may be arranged in a single ring or may be arranged in a plurality of rings along outer surface 560. Each magnet 512 may be positioned adjacent to another magnet 512 along convex outer surface so that stator 568 is continuously interacting with a magnet to produce a rotation of rotor 500. In one or more embodiments, hub and hoop may be made from various materials, such as, for example, steel. In an embodiment, rings and/or layers of rings of magnets 512 may be formed by using adhesive between each of the magnets 512. The adhesive may include epoxy which may be heat cure, UV cure, or the like. The ring of magnets may be formed by stacking layers of magnets on top of one another and using adhesive to adhere adjacent magnetic elements. The magnets may be rare earth magnets, including without limitation Neodymium magnets. Magnets and hoop may be consistent with any magnet or hoop as discussed herein.

Still referring to FIGS. 5A and 5B, and in one or more embodiments, magnets 512 may include a magnet array. In non-limiting embodiments, a magnet array may include a Halbach array. A Halbach array is a special arrangement of permanent magnets that augments the magnetic field on one side of the array while canceling the field to near zero on the other side of the array. In general, the Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. One of ordinary skill in the art would appreciate that the area that the Halbach array augments the magnetic field of may be configurable or adjustable.

Still referring to FIGS. 5A and 5B, and in one or more embodiments, hoop 526 may include cooling features, such as, for example, an integrated radial fan 532 or an integrated axial fan 536. A radial fan may comprise cooling fins positioned on an upper surface of hoop 526 and provide cooling to a stator when rotor 500 is rotating about central axis A. An axial fan may include fins positioned along an inner surface of hoop 526 and provide cooling to motor. Radial fan and/or axial fans may increase air flow in rotor 500 and cause convection cooling. Radial and axial fans may be consistent with motor cooling fans provided in the disclosure U.S. application Ser. No. 17/563,498, titled "AN ELECTRIC AIRCRAFT LIFT MOTOR WITH AIR COOLING", which is incorporated in this disclosure in its entirety. In one or more embodiments, hoop 526 may include various types of materials, such as for example, titanium, steel, and the like.

Still referring to FIGS. 5A and 5B, and in one or more embodiments, a retention band 528 surrounds magnets 512. Additional disclosure on retention bands and magnets are discussed in FIGS. 7 and 5. Retention band 528 may be present around the outer surface of magnets 512. The outer surface of magnets 512 may be the surface opposite the surface in contact with hoop 526. Retention band 528 may be a sleeve of a solid material or an aggregation of individual materials that run along the outer surface of magnets 512. Retention band 528 may be made from various materials, such as stainless steel, titanium, carbon, carbon-composite, and the like. Retention band 528 and magnets 512 may have the same or similar coefficients of thermal expansion. As a result, retention band 528 and/or magnets 512 may expand or shrink at similar rates, allowing for uniform stress around the magnets 512. A similar coefficient of thermal expansion may allow for no point forces to form between the retention band 528 and magnets 512. As used herein, a "retention band" is a component for maintaining a position of the component it is surrounding. For example, a retention band may be configured to maintain a position of magnets 512 by providing inward forces around the magnets 512. For example, retention band 528 may provide stability for rotor 500 and prevent magnets 512 from lifting from outer surface 560 of hoop 526 due to centrifugal forces. Retention band 528 may include slits of various shapes and patterns to provide venting for temperature management purposes. For, example, slits 542 allow for air to pass through retention band 528, allowing air to circulate through rotor 500 when rotor 500 is spinning about central axis A.

Still referring to FIGS. 5A and 5B, retention band 528 may be configured to reduce eddy currents. As used herein, "eddy currents" are loops of electrical current induced by a changing magnetic field. These voltages may cause small circulating currents to flow, which may be eddy currents. Eddy currents may serve no useful purpose in a motor and result in wasted power. A retention band 528 composed of a poor conductor, such as titanium, steel, plastics, rubber, and the like, may be used to reduce eddy currents. A poor conductor may be a material with a low conductivity. A low conductivity may be less than 3E6 S/m at 20° C. Additionally, the slits of retention band 528 may reduce eddy currents by breakup the area that the currents may circulate in.

Still referring to FIGS. 5A and 5B, and in one or more embodiments, rotor 500 includes a plurality of spokes 540, that radiate from hub 508 to connect hub 508 and hoop 526. Spokes 540 may extend radially outward from hub 508 to hoop 526. Spokes 540 may be positioned in various arrangement to provide structural support to rotor 500. In one or more embodiments, spokes 540 may be made from various materials, such as steel, titanium and the like. In some embodiments, hoop 526 and spokes 540 may be separate components that may be assembly together. In other embodiments, hoop 526 and spokes 540 may be a monolithic structure. For example, in some cases spokes may include a single element, such as without limitation a disc. Disc may be solid or may include holes. In one or more embodiments, a distal end 544 of each spoke may terminate at and/or be attached to hoop 526, and a proximal end of each spoke 540 may be attached to hub 508.

Referring now to FIG. 6, an exemplary embodiment of an electric aircraft 600 with a propulsor 604 is illustrated in accordance with one or more embodiments of the present disclosure. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 600 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eVTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference.

Still referring to FIG. 6, and as used in this disclosure, a "vertical take-off and landing (eVTOL) aircraft" is an aircraft that can hover, take off, and land vertically. In some embodiments, the eVTOL aircraft may use an energy source of a plurality of energy sources to power aircraft. To optimize the power and energy necessary to propel aircraft 600, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where an aircraft is capable of flight using wings and/or foils that generate lift caused by the aircraft's forward airspeed and the shape of the wings and/or foils, such as airplane-style flight.

Still referring to FIG. 6, and in one or more embodiments, aircraft 600 may include motor, which may be mounted on a structural feature of an aircraft. Design of motor may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of aircraft 600. For example, and without limitation structural feature may be any portion of a vehicle incorporating motor, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 604. Persons skilled in the art, upon reviewing the entirety of this disclosure, will be aware of various materials, combinations of materials, and/or constructions techniques.

Still referring to FIG. 6, aircraft 600 may include a propulsor 604. For the purposes of this disclosure, a "propulsor" is a component or device used to propel a craft by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel, and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment, propulsor may include a rotating power-driven hub, to which are attached several radial airfoil-section blades such that the whole assembly rotates about a longitudinal axis. In one or more embodiments, a rotor may be used in a motor of a lift propulsor, which is further described in this disclosure with reference to FIG. 6. For the purposes of this disclosure, a "lift propulsor" is a propulsor that produces lift. In one or more exemplary embodiments, propulsor 604 may include a vertical propulsor or a forward propulsor. A forward propulsor may include a propulsor configured to propel aircraft 600 in a forward direction. A vertical propulsor may include a propulsor configured to propel aircraft 600 in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

Still referring to FIG. 6, and in an embodiment, propulsor 604 may include a propeller, a blade, or the like. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of a propeller may, for example, be fixed, manually variable to a few set positions, automatically variable (e.g. a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates.

Still referring to FIG. 6, and in an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 6, a propulsor may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 600 forward with an equal amount of force. In an embodiment, and without limitation, the more air forced behind aircraft, the greater the thrust force with which aircraft 600 is pushed horizontally will be. In another embodiment, and without limitation, forward thrust may force aircraft 600 through the medium of relative air. Additionally or alternatively, plurality of propulsor may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 6, and in one or more embodiments, propulsor 604 includes a motor. The motor may include, without limitation, any electric motor, where an electric motor is a device that converts electrical energy into mechanical energy, for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and the like.

Still referring to FIG. 6, propulsor 604 may include two or more blades 608. In an embodiment, a propulsor 604 may include an advancing blade and a retreating blade. An advancing blade moves towards a nose 612 of an aircraft and a retreating blade moves towards a tail 616 of an aircraft. Blades 608 may be solid blades. As used herein, a "solid blade" is a blade such that is substantially rigid and not susceptible to bending during flight. Blade pitch on solid blades may not be individually adjustable, therefore cyclic controls may only control the blade pitch as a whole. Specifically, the advancing blade and the retreating blade may be considered a solid blade together and may not be individually adjusted and may be adjusted as a whole. As used herein, "blade pitch" is the angle of a blade. Cyclic controls are discussed in further detail in FIG. 2.

Still referring to FIG. 6, aircraft 600 may include a fuselage 620. In one or more embodiments, and as used in this disclosure, a "fuselage" is a main body of an aircraft. In one or more embodiments, fuselage 620 may include the entirety of aircraft except for a cockpit, nose, wings, empennage, nacelles, flight components, such as any and all control surfaces and propulsors. Fuselage 620 may contain a payload of aircraft. In one or more embodiments, airframe may form fuselage 620. For example, and without limitation, one or more structural elements of airframe may be used to form fuselage 620. For the purposes of this disclosure, "structural elements" include elements that physically support a shape and structure of an aircraft. Structural elements may take a plurality of forms, alone or in combination with other types. In one or more embodiments, a structural element may include a carbon fiber composite structure, as previously mentioned. The carbon fiber composite structure is configured to include high stiffness, high tensile strength, low weight to strength ratio, high chemical resistance, high temperature tolerance, and low thermal expansion. In one or more embodiments, a carbon fiber composite may include one or more carbon fiber structures comprising a plastic resin and/or graphite. For example, a carbon fiber composite may be formed as a function of a binding carbon fiber to a thermoset resin, such as an epoxy, and/or a thermoplastic polymer, such as polyester, vinyl ester, nylon, and the like thereof. Structural element may vary depending on a construction type of aircraft. For example, and without limitation, structural element may vary if forming the portion of aircraft that is fuselage 620. Fuselage 620 may include a truss structure. A truss structure may be used with a lightweight aircraft and include welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may include steel tubes and/or wood beams Now referring to FIG. 7, an exemplary embodiment 700 of a flight controller 704 is illustrated. As used in this disclosure a "flight controller" is a computing device of a plurality of computing devices dedicated to data storage, security, distribution of traffic for load balancing, and flight instruction. Flight controller 704 may include and/or communicate with any computing device as described in this disclosure, including without limitation a microcontroller, microprocessor, digital signal processor (DSP) and/or system on a chip (SoC) as described in this disclosure. Further, flight controller 704 may include a single computing device operating independently, or may include two or more computing device operating in concert, in parallel, sequentially or the like; two or more computing devices may be included together in a single computing device or in two or more computing devices. In embodiments, flight controller 704 may be installed in an aircraft, may control the aircraft remotely, and/or may include an element installed in the aircraft and a remote element in communication therewith.

Figure 7:
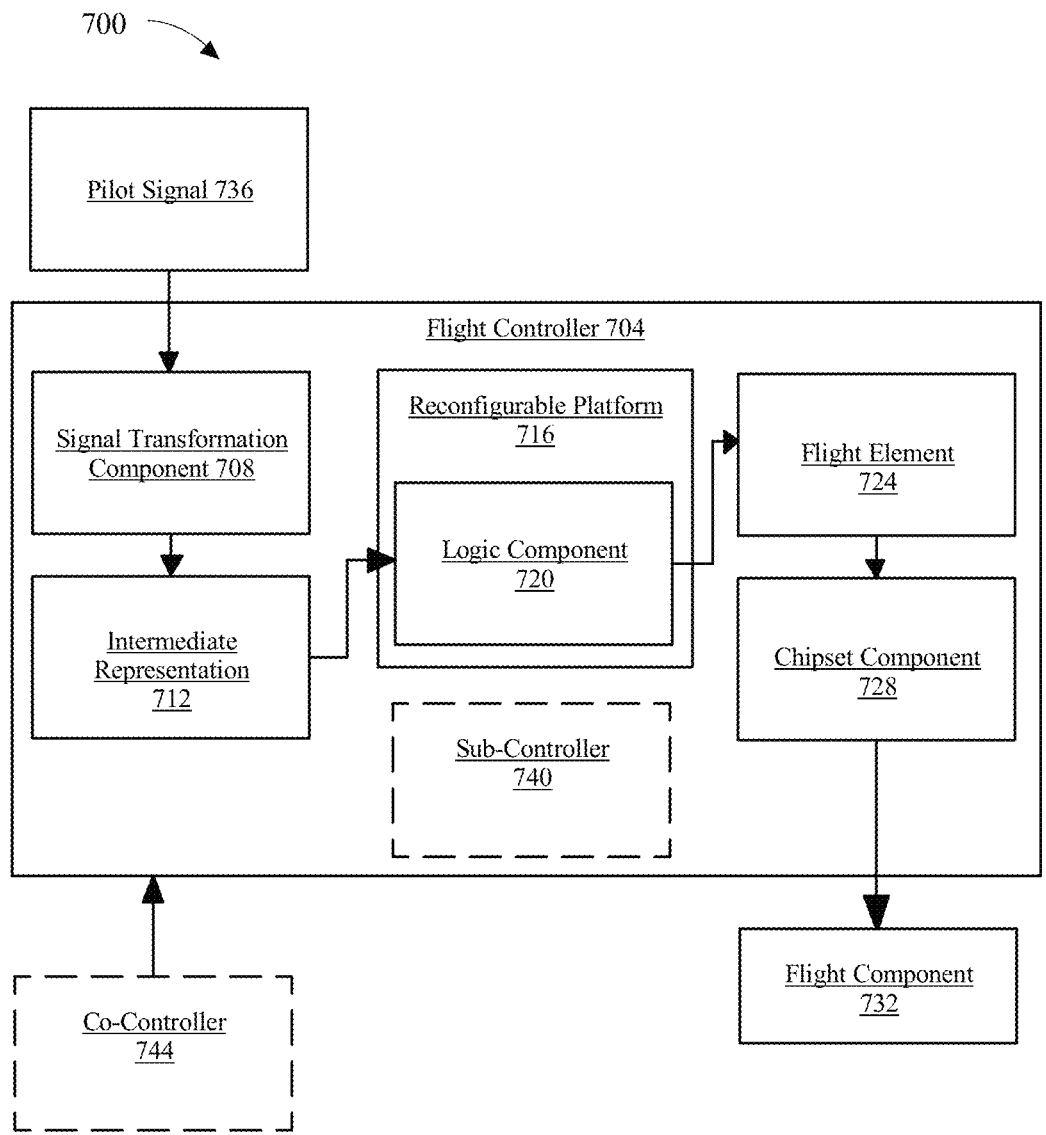
FIG. 7 is a block diagram of an exemplary embodiment of a flight controller.

In an embodiment, and still referring to FIG. 7, flight controller 704 may include a signal transformation component 708. As used in this disclosure a "signal transformation component" is a component that transforms and/or converts a first signal to a second signal, wherein a signal may include one or more digital and/or analog signals. For example, and without limitation, signal transformation component 708 may be configured to perform one or more operations such as preprocessing, lexical analysis, parsing, semantic analysis, and the like thereof. In an embodiment, and without limitation, signal transformation component 708 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 708 may include transforming one or more low-level languages such as, but not limited to, machine languages and/or assembly languages. For example, and without limitation, signal transformation component 708 may include transforming a binary language signal to an assembly language signal. In an embodiment, and without limitation, signal transformation component 708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 7, signal transformation component 708 may be configured to optimize an intermediate representation 712. As used in this disclosure an "intermediate representation" is a data structure and/or code that represents the input signal. Signal transformation component 708 may optimize intermediate representation as a function of a data-flow analysis, dependence analysis, alias analysis, pointer analysis, escape analysis, and the like thereof. In an embodiment, and without limitation, signal transformation component 708 may optimize intermediate representation 712 as a function of one or more inline expansions, dead code eliminations, constant propagation, loop transformations, and/or automatic parallelization functions. In another embodiment, signal transformation component 708 may optimize intermediate representation as a function of a machine dependent optimization such as a peephole optimization, wherein a peephole optimization may rewrite short sequences of code into more efficient sequences of code. Signal transformation component 708 may optimize intermediate representation to generate an output language, wherein an "output language," as used herein, is the native machine language of flight controller 704. For example, and without limitation, native machine language may include one or more binary and/or numerical languages.

In an embodiment, and without limitation, signal transformation component 708 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field/with q elements; strings so encoded have a minimum hamming distance of $k+1$, and permit correction of $(q-k-1)/2$ erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 7, flight controller 704 may include a reconfigurable hardware platform 716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 716 may be reconfigured to enact any algorithm and/or algorithm selection process received from another computing device and/or created using machine-learning processes.

Still referring to FIG. 7, reconfigurable hardware platform 716 may include a logic component 720. As used in this disclosure a "logic component" is a component that executes instructions on output language. For example, and without limitation, logic component may perform basic arithmetic, logic, controlling, input/output operations, and the like thereof. Logic component 720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 720 may be organized according to Von Neumann and/or Harvard architecture as a non-limiting example. Logic component 720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 720 may include one or more integrated circuit microprocessors, which may contain one or more central processing units, central processors, and/or main processors, on a single metal-oxide-semiconductor chip. Logic component 720 may be configured to execute a sequence of stored instructions to be performed on the output language and/or intermediate representation 712. Logic component 720 may be configured to fetch and/or retrieve the instruction from a memory cache, wherein a "memory cache," as used in this disclosure, is a stored instruction set on flight controller 704. Logic component 720 may be configured to decode the instruction retrieved from the memory cache to opcodes and/or operands. Logic component 720 may be configured to execute the instruction on intermediate representation 712 and/or output language. For example, and without limitation, logic component 720 may be configured to execute an addition operation on intermediate representation 712 and/or output language.

In an embodiment, and without limitation, logic component 720 may be configured to calculate a flight element 724. As used in this disclosure a "flight element" is an element of datum denoting a relative status of aircraft. For example, and without limitation, flight element 724 may denote one or more torques, thrusts, airspeed velocities, forces, altitudes, groundspeed velocities, directions during flight, directions facing, forces, orientations, and the like thereof. For example, and without limitation, flight element 724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 724 may denote that aircraft is following a flight path accurately and/or sufficiently.

Still referring to FIG. 7, flight controller 704 may include a chipset component 728. As used in this disclosure a "chipset component" is a component that manages data flow. In an embodiment, and without limitation, chipset component 728 may include a northbridge data flow path, wherein the northbridge dataflow path may manage data flow from logic component 720 to a high-speed device and/or component, such as a RAM, graphics controller, and the like thereof. In another embodiment, and without limitation, chipset component 728 may include a southbridge data flow path, wherein the southbridge dataflow path may manage data flow from logic component 720 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 728 may manage data flow between logic component 720, memory cache, and a flight component 732. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 732 may include a rudder to control yaw of an aircraft. In an embodiment, chipset component 728 may be configured to communicate with a plurality of flight components as a function of flight element 724. For example, and without limitation, chipset component 728 may transmit to an aircraft rotor to reduce torque of a first lift propulsor and increase the forward thrust produced by a pusher component to perform a flight maneuver.

In an embodiment, and still referring to FIG. 7, flight controller 704 may be configured generate an autonomous function. As used in this disclosure an "autonomous function" is a mode and/or function of flight controller 704 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 724. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 704 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 704 will control the ailerons and/or rudders. As used in this disclosure "non-autonomous mode" is a mode that denotes a pilot will control aircraft and/or maneuvers of aircraft in its entirety.

In an embodiment, and still referring to FIG. 7, flight controller 704 may generate autonomous function as a function of an autonomous machine-learning model. As used in this disclosure an "autonomous machine-learning model" is a machine-learning model to produce an autonomous function output given flight element 724 and a pilot signal 736 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 736 may denote that a pilot is controlling and/or maneuvering ailerons, wherein the pilot is not in control of the rudders and/or propulsors. In an embodiment, pilot signal 736 may include an implicit signal and/or an explicit signal. For example, and without limitation, pilot signal 736 may include an explicit signal, wherein the pilot explicitly states there is a lack of control and/or desire for autonomous function. As a further non-limiting example, pilot signal 736 may include an explicit signal directing flight controller 704 to control and/or maintain a portion of aircraft, a portion of the flight plan, the entire aircraft, and/or the entire flight plan. As a further non-limiting example, pilot signal 736 may include an implicit signal, wherein flight controller 704 detects a lack of control such as by a malfunction, torque alteration, flight path deviation, and the like thereof. In an embodiment, and without limitation, pilot signal 736 may include one or more explicit signals to reduce torque, and/or one or more implicit signals that torque may be reduced due to reduction of airspeed velocity. In an embodiment, and without limitation, pilot signal 736 may include one or more local and/or global signals. For example, and without limitation, pilot signal 736 may include a local signal that is transmitted by a pilot and/or crew member. As a further non-limiting example, pilot signal 736 may include a global signal that is transmitted by air traffic control and/or one or more remote users that are in communication with the pilot of aircraft. In an embodiment, pilot signal 736 may be received as a function of a tri-state bus and/or multiplexor that denotes an explicit pilot signal should be transmitted prior to any implicit or global pilot signal.

Still referring to FIG. 7, autonomous machine-learning model may include one or more autonomous machine-learning processes such as supervised, unsupervised, or reinforcement machine-learning processes that flight controller 704 and/or a remote device may or may not use in the generation of autonomous function. As used in this disclosure "remote device" is an external device to flight controller 704. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 7, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 704 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 7, flight controller 704 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 704. Remote device and/or FPGA may transmit a signal, bit, datum, or parameter to flight controller 704 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 704 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 7, flight controller 704 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 7, flight controller 704 may include, but is not limited to, for example, a cluster of flight controllers in a first location and a second flight controller or cluster of flight controllers in a second location. Flight controller 704 may include one or more flight controllers dedicated to data storage, security, distribution of traffic for load balancing, and the like. Flight controller 704 may be configured to distribute one or more computing tasks as described below across a plurality of flight controllers, which may operate in parallel, in series, redundantly, or in any other manner used for distribution of tasks or memory between computing devices. For example, and without limitation, flight controller 704 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an autocode, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 7, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 732. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 7, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 704. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 712 and/or output language from logic component 720, wherein output language may include one or more analog-to-digital conversions, low bit rate transmissions, message encryptions, digital signals, binary signals, logic signals, analog signals, and the like thereof described above in detail.

Still referring to FIG. 7, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 7, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 7, flight controller 704 may also be implemented using a "shared nothing" architecture in which data is cached at the worker, in an embodiment, this may enable scalability of aircraft and/or computing device. Flight controller 704 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 7, flight controller may include a sub-controller 740. As used in this disclosure a "sub-controller" is a controller and/or component that is part of a distributed controller as described above; for instance, flight controller 704 may be and/or include a distributed flight controller made up of one or more sub-controllers. For example, and without limitation, sub-controller 740 may include any controllers and/or components thereof that are similar to distributed flight controller and/or flight controller as described above. Sub-controller 740 may include any component of any flight controller as described above. Sub-controller 740 may be implemented in any manner suitable for implementation of a flight controller as described above. As a further non-limiting example, sub-controller 740 may include one or more processors, logic components and/or computing devices capable of receiving, processing, and/or transmitting data across the distributed flight controller as described above. As a further non-limiting example, sub-controller 740 may include a controller that receives a signal from a first flight controller and/or first distributed flight controller component and transmits the signal to a plurality of additional sub-controllers and/or flight components.

Still referring to FIG. 7, flight controller may include a co-controller 744. As used in this disclosure a "co-controller" is a controller and/or component that joins flight controller 704 as components and/or nodes of a distributer flight controller as described above. For example, and without limitation, co-controller 744 may include one or more controllers and/or components that are similar to flight controller 704. As a further non-limiting example, co-controller 744 may include any controller and/or component that joins flight controller 704 to distributer flight controller. As a further non-limiting example, co-controller 744 may include one or more processors, logic components and/or computing devices capable of receiving, processing, and/or transmitting data to and/or from flight controller 704 to distributed flight control system. Co-controller 744 may include any component of any flight controller as described above. Co-controller 744 may be implemented in any manner suitable for implementation of a flight controller as described above.

In an embodiment, and with continued reference to FIG. 7, flight controller 704 may be designed and/or configured to perform any method, method step, or sequence of method steps in any embodiment described in this disclosure, in any order and with any degree of repetition. For instance, flight controller 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
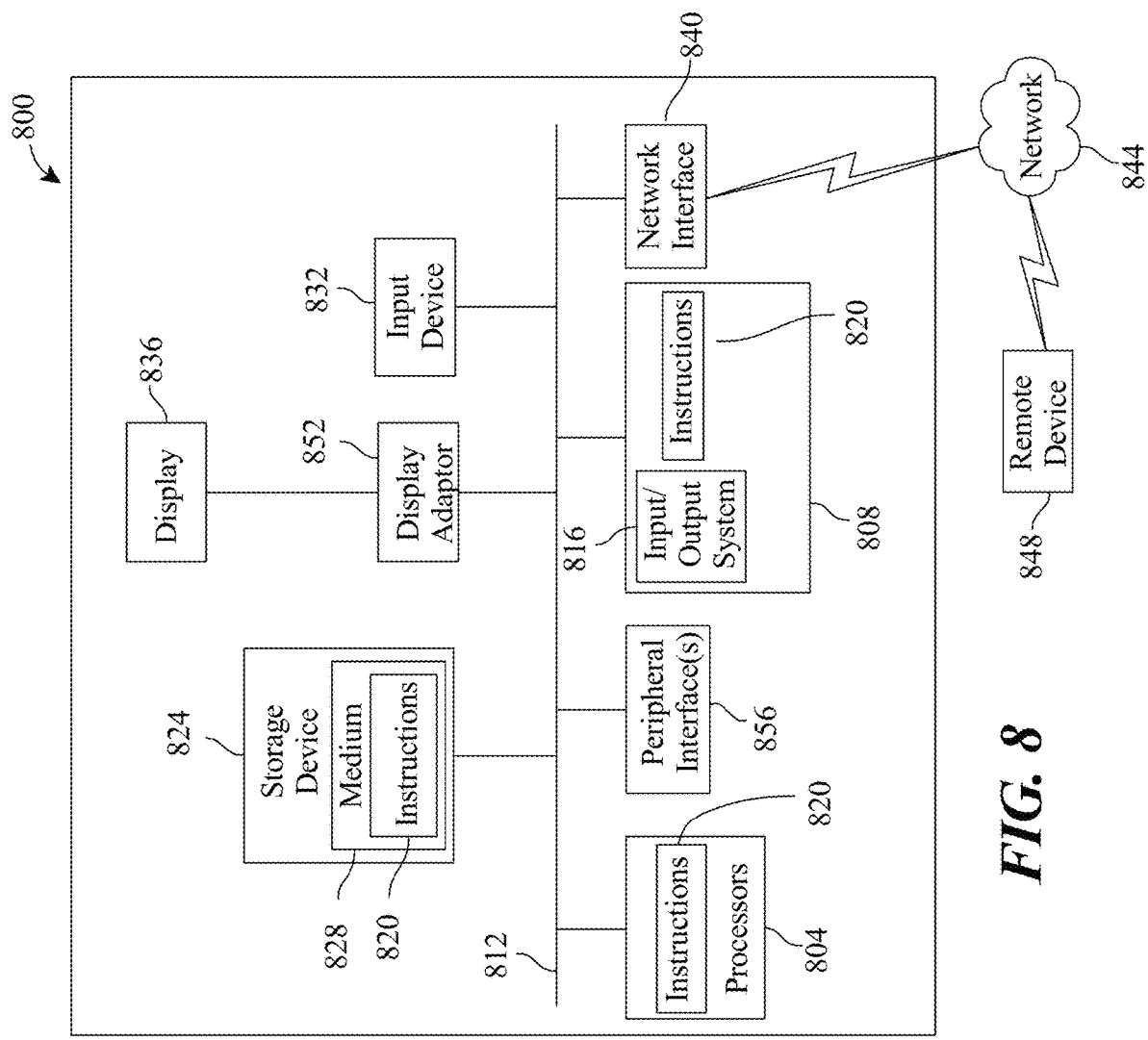
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft, comprising:
a plurality of vertical lift propulsor assemblies, each of the plurality of vertical lift propulsor assemblies comprising:
a propulsor coupled to the aircraft and driven by an electric motor including a rotor and a stator, the rotor mechanically connected to the propulsor such that the rotor and the propulsor are configured to rotate about a rotational axis, the propulsor including a hub and a plurality of blades each extending outward from the hub, the hub being coupled to a shaft that is driven by the rotor, the hub and blades being formed as a single element such that a blade angle of the plurality of blades of the propulsor is not individually adjustable;
a cyclic control assembly, comprising:
an actuator; and
a push rod extending through the shaft, wherein:
the push rod is coupled to the actuator and the propulsor;
the push rod is configured to increase the blade angle of the plurality of blades of the propulsor in response to a displacement of the push rod in a first direction; and
the push rod is configured to decrease the blade angle of the plurality of blades of the propulsor in response to a displacement of the push rod in a second direction; and
a flap mechanism mechanically connected to the propulsor, the flap mechanism configured to allow the propulsor to rotate about a pivot point of the flap mechanism, the flap mechanism comprising:
a base rotatably attached to the aircraft and configured to rotate about the rotational axis; and
a pair of hinges that couple the base and the hub of the propulsor, wherein the pair of hinges is configured to allow the propulsor to rotate about the pivot point of the flap mechanism, the pair of hinges comprising:
a first hinge coupled on the base and received in a first recess defined in an interior facing surface of the hub, at a first side of the rotational axis;
a second hinge coupled on the hub and received in a second recess defined in the interior facing surface of the hub, at a second side of the rotational axis opposite the first side; and
a rod having a first end extending through the first hinge and into the hub, and a second end extending through the second hinge and into the hub.

2. The aircraft of claim 1, further comprising a flight controller, wherein:
the flight controller is communicatively connected to the actuator; and
the flight controller is configured to:
command the actuator to increase the blade angle of the propulsor; and
command the actuator to decrease the blade angle of the propulsor.

3. The aircraft of claim 1, wherein the plurality of blades comprises two blades.

4. The aircraft of claim 1, wherein the electric motor comprises:
a first electric motor, the first electric motor comprising a first stator that interacts with the rotor to drive the shaft; and
a second electric motor, wherein the second electric motor comprises a second stator that interacts with the rotor to drive the shaft.

5. The aircraft of claim 1, wherein the flap mechanism is configured to passively control in-flight transients.

6. The aircraft of claim 1, wherein the actuator is a first actuator, and wherein the cyclic control assembly comprises a second actuator, wherein the second actuator is coupled to the push rod and is configured to rotate the push rod about a transverse axis.

7. The aircraft of claim 1, further comprising:
a flight controller; and
a plurality of pilot controls, wherein:
the flight controller is in communication with the plurality of pilot controls; and
the actuator is in communication with the flight controller, such that the flight controller generates commands for actuation of the actuator in response to inputs received from the plurality of pilot controls.

8. The aircraft of claim 1, wherein the flap mechanism includes:
a first spring coupled between the base and the hub at a first side of a pivot axis of the flap mechanism defined by the rod; and
a second spring coupled between the base and the hub at a second side of the pivot axis of the flap mechanism defined by the rod, wherein the first spring and the second spring limit an amount of rotation of the propulsor about the pivot axis.

9. The aircraft of claim 1, wherein the shaft mechanically coupling the rotor and the propulsor includes:
a proximal end;
a distal end mechanically coupled to the propulsor; and
a central lumen extending from the proximal end to the distal end, wherein the push rod extends at least partially through the central lumen.

10. The aircraft of claim 9, wherein the push rod is oriented in parallel to the rotational axis of the rotor.

11. The aircraft of claim 1, wherein the cyclic control assembly further comprises a swashplate rocker, wherein the swashplate rocker mechanically connects the push rod and the actuator.

12. The aircraft of claim 11, wherein the swashplate rocker is configured to:
translate movement by the actuator in a first actuation direction into movement of the push rod in the first direction; and
translate movement by the actuator in a second actuation direction into movement of the push rod in the second direction.

13. The aircraft of claim 1, wherein the cyclic control assembly further comprises a propulsor rocker, wherein the propulsor rocker is mechanically connected to the push rod and the propulsor.

14. The aircraft of claim 13, wherein the propulsor rocker is configured to:
translate movement by the push rod in the first direction to an increase in the blade angle of the propulsor; and
translate movement by the push rod in the second direction to a decrease in the blade angle of the propulsor.

15. The aircraft of claim 13, wherein:
the propulsor rocker comprises a first propulsor rocker end and a second propulsor rocker end;
the second propulsor rocker end is attached to the push rod; and
the first propulsor rocker end is attached to a propulsor link.

16. The aircraft of claim 1, wherein the flap mechanism further comprises a locking mechanism comprising a plurality of springs.

17. The aircraft of claim 16, wherein each spring of the plurality of springs is attached to the base of the flap mechanism and the propulsor.

18. The aircraft of claim 1, wherein the first direction and the second direction are substantially parallel to the rotational axis of the rotor and the propulsor, and to an orientation of the push rod.

19. The aircraft of claim 18, wherein a reference plane corresponding to a chord of the propulsor is substantially orthogonal to the rotational axis, and wherein the blade angle of the propulsor is changed relative to the reference plane of the propulsor in response to movement of the push rod in the first direction or the second direction.

20. An aircraft, comprising:
a plurality of vertical lift propulsor assemblies, each of the plurality of vertical lift propulsor assemblies comprising:
a propulsor coupled to the aircraft and driven by an electric motor including a rotor and a stator, the rotor mechanically connected to the propulsor such that the rotor and the propulsor are configured to rotate about a rotational axis, the propulsor including a hub and a plurality of blades each extending outward from the hub, the hub being coupled to a shaft that is driven by the rotor, the hub and blades being formed as a single element such that a blade angle of the plurality of blades of the propulsor is not individually adjustable;
a cyclic control assembly, comprising:
an actuator; and
a push rod extending through the shaft, wherein:
the push rod is coupled to the actuator and the propulsor;
the push rod is configured to increase the blade angle of the plurality of blades of the propulsor in response to a displacement of the push rod in a first direction; and
the push rod is configured to decrease the blade angle of the plurality of blades of the propulsor in response to a displacement of the push rod in a second direction; and
a flap mechanism mechanically connected to the propulsor, the flap mechanism configured to allow the propulsor to rotate about a pivot point of the flap mechanism, the flap mechanism comprising:
a base rotatably attached to the aircraft and configured to rotate about the rotational axis;
a pair of hinges that couple the base and the hub of the propulsor, wherein the pair of hinges is configured to allow the propulsor to rotate about the pivot point of the flap mechanism, the pair of hinges comprising:
a first hinge coupled on the base and received in a first recess defined in an interior facing surface of the hub, at a first side of the rotational axis;
a second hinge coupled on the hub and received in a second recess defined in the interior facing surface of the hub, at a second side of the rotational axis opposite the first side; and
a rod having a first end extending through the first hinge and into the hub, and a second end extending through the second hinge and into the hub;
a first spring coupled between the base and the hub at a first side of a pivot axis of the flap mechanism defined by the rod; and
a second spring coupled between the base and the hub at a second side of the pivot axis of the flap mechanism defined by the rod, wherein the first spring and the second spring limit an amount of rotation of the propulsor about the pivot axis.

* * * * *